United States Patent

Shiota et al.

[11] Patent Number: 5,770,093
[45] Date of Patent: Jun. 23, 1998

[54] CATALYST FOR TREATMENT OF WASTE WATER, METHOD FOR PRODUCTION THEREOF AND METHOD FOR TREATMENT OF WASTE WATER THEREWITH

[75] Inventors: Yusuke Shiota; Tohru Ishii; Kiichiro Mitsui, all of Hyogo, Japan

[73] Assignee: Nippon Shokubai Co., Ltd., Osaka-fu, Japan

[21] Appl. No.: 641,839

[22] Filed: May 2, 1996

Related U.S. Application Data

[63] Continuation of Ser. No. 364,741, Dec. 27, 1994, abandoned.

[30] Foreign Application Priority Data

Dec. 28, 1993 [JP] Japan ..................................... 5-335957
Oct. 7, 1994 [JP] Japan ..................................... 6-243593

[51] Int. Cl.$^6$ ....................................................... C02F 1/72
[52] U.S. Cl. .......................................... 210/762; 210/763
[58] Field of Search ...................................... 210/762, 763

[56] References Cited

U.S. PATENT DOCUMENTS 5,145,587  9/1992  Ishii et al. ............................... 210/762
5,620,610  4/1997  Ishii et al. ............................... 210/762

FOREIGN PATENT DOCUMENTS 0354664  7/1989  European Pat. Off. .
0431932  12/1990  European Pat. Off. .

OTHER PUBLICATIONS

European Search Report EP 95 90 4018–Oct. 1, 1996.

*Primary Examiner*—Neil McCarthy
*Attorney, Agent, or Firm*—Omri M. Behr, Esq.

[57] ABSTRACT

A catalyst for the treatment of a waste water comprises an oxide and/or a composite oxide of manganese, the oxide and/or the composite oxide of at least one metal selected from the group consisting of iron, titanium, and zirconium, and optionally a precious metal. A method for the production of this catalyst is also disclosed. A method for the treatment of a waste water comprises subjecting the waste water to wet oxidation treatment with an oxygen-containing gas by the use of a catalyst under pressure such that the waste water retains the liquid phase thereof.

20 Claims, 1 Drawing Sheet

CATALYST FOR TREATMENT OF WASTE WATER, METHOD FOR PRODUCTION THEREOF AND METHOD FOR TREATMENT OF WASTE WATER THEREWITH

This application is a continuation of application Ser. No. 08/364,741, field Dec. 27, 1994 now abandoned.

TECHNICAL FIELD

This invention relates to a catalyst for the treatment of a waste water, a method for the production thereof, and a method for the treatment of a waste water with the catalyst. More particularly, the present invention is used in the treatment for purification of waste water from chemical plant facilities, plating industry facilities, leather production facilities, metal industry facilities, metal mining facilities, food production facilities, pharmaceutical industry facilities, textile industry facilities, paper pulp industry facilities, dye industry facilities, glass production facilities, photographic processing facilities, etc. It is particularly used in the purification of waste water by the method of catalytic wet oxidation treatment among other methods of waste water purification. It relates to a catalyst for the decomposition of organic substances and/or inorganic COD components contained in the waste water involved therein and a method for the production of this catalyst. It further relates to a method for the purification of the waste water by the wet oxidation treatment performed in the presence of the catalyst.

BACKGROUND ART

Heretofore, as means to treat waste water, the method of biological treatment which is popularly called an activated sludge method, the method of combustion disposal by incineration, and the method of non-catalytic wet oxidation treatment which is otherwise called a Zimmerman method have been known.

The method of biological treatment is at a disadvantage in consuming a long time in the decomposition of organic substances, necessitating a complicated process for the disposal of such sparingly decomposable nitrogen compounds as ammonia, and demanding a large floor space for the installation of facilities required for diluting waste water to a concentration proper for the growth of microorganisms such as algae and bacteria and adjusting waste water to a pH value proper for the growth of such microorganisms.

The method of combustion disposal has the disadvantage of incurring expenses such as for the fuel to be used for the combustion and entailing the problem of secondary air pollution with the waste gas from the combustion.

The method of non-catalytic wet oxidation treatment or the Zimmerman method comprises treating a given waste water at a high temperature under a high pressure in the presence of oxygen gas thereby effecting oxidation and/or oxidative decomposition of organic substances and/or inorganic COD components contained in the waste water and proves excellent as a means of treatment. Since this method generally attains the treatment with low efficiency, it often requires facilities for a secondary treatment.

Thus, methods for using various kinds of catalyst for the main purpose of improving the efficiency of treatment in this method of wet oxidation treatment have been proposed. The method of wet oxidation using a solid catalyst (hereinafter referred to otherwise as "catalytic wet oxidation treatment") has been particularly attracting attention on account of great ability to purify a waste water and from the viewpoint of excellent economy. The conventional catalysts proposed in association with this method are those which have such precious metals as palladium and platinum deposited on carriers such as alumina, silica, silica gel, and activated carbon (JP-A-49-44,556 and JP-A-49-94,157).

Generally, however, the waste water rarely contain components which are identical in kind. It often happens, for example, that nitrogen-containing compounds, sulfur-containing compounds, and halogen-containing compounds are contained in a waste water besides such organic substances as do not contain a nitrogen atom, a sulfur atom, or a halogen atom.

Solely with the catalysts mentioned above, however, these components have often defied a fully satisfactory treatment.

The conventional methods cited above have not been fully efficient particularly in the treatment of various kinds of waste water such as, for example, waste water containing nitrogen containing compounds such as organic nitrogen compounds including amine compounds, amide compounds, and amino acid compounds or inorganic nitrogen compounds including ammonia and hydrazine which are copiously entrained by the waste water from various chemical plants; waste water containing sulfur containing compounds such as inorganic sulfur compounds including thiosulfuric acid, sulfurous acid, and sulfides which are copiously entrained by the waste water from the petrochemical industry plants and the waste water from the photographic processing plants and organic sulfur compounds used copiously in surfactants and solvents; and waste water containing halogen containing compounds including halogen compounds copiously entrained by the waste water of detergents and fine chemicals. In the case of the conventional catalytic wet oxidation treatment mentioned above, it has been ascertained by the present inventors' study that the catalyst, when put to protracted use, suffers degradation of strength and succumbs to fracture and comminution and even dissolution. Thus, the catalyst used therein is too deficient in durability to be practicable.

As yet another technique for the solution of the problem mentioned above, the method which resorts to use of titania or zirconia as the carrier for the catalyst has been proposed (JP-A-58-64,188). The invention amounts to disclosure of a catalyst having precious metals such as palladium and platinum and heavy metals such as iron and cobalt deposited on a carrier formed of spheres or cylinders of titania or zirconia. It has a mention to the effect that this catalyst possesses highly satisfactory strength as compared with the conventional carrier. The catalysts contemplated in connection with this method are invariably not fully satisfactory in terms of catalytic activity and durability.

With a view to solving these problems, the present inventors have already proposed a method for treating a waste water with a catalyst comprising a composite oxide of titanium and zirconium, precious metals such as palladium and platinum, and/or heavy metals such as cobalt and nickel (JP-B-03-34,997) and a catalyst comprising the oxide of iron and at least one element selected from the group consisting of titanium, silicon, and zirconium, precious metals such as palladium and platinum, and/or heavy metals such as cobalt and nickel and method for treating a waste water with the catalyst (JP-A-05-138,027). These catalysts are invariably excellent in catalytic activity and durability. If their economy and efficiency of purification in the treatment of a waste water are further improved, they will be able to obtain still more desirable results.

Further, in the catalytic wet oxidation treatment of a waste water, a reaction tube such as of stainless steel is generally adopted from the viewpoint of cost. Since this reaction tube is vulnerable to corrosion in the acidic zone, the practice of adjusting the pH value of the waste water to the alkaline zone before the waste water is put to use in the reaction is dominant. A waste water which particularly contains a nitrogen-containing compound, a sulfur-containing compound, and a halogen-containing compound is caused by the treatment under discussion to form a nitric acid ion, a sulfuric acid ion, and a halide ion. More often than not, therefore, the treatment of this waste water in the acidic zone is difficult to effect. In this case, however, some of these catalysts fail to exhibit ample durability and activity when they are used in the alkaline zone. Thus, the desirability of perfecting a catalyst which exhibits ample durability and activity even when the waste water under treatment has a pH value in the alkaline zone has been finding approval.

An object of this invention, therefore, is to provide a novel catalyst for the treatment of a waste water, a method for the production thereof, and a method for the treatment of a waste water by the use of the catalyst.

Another object of this invention is to provide a method for the catalytic wet oxidation treatment which, even on a waste water which contains nitrogen-containing compounds, sulfur-containing compounds, and halogen-containing compounds besides hydrocarbon type organic substances not containing a nitrogen atom, a sulfur atom, or a halogen atom and which, therefore, permits no easy treatment, in other words, a waste water which contains harmful substances including various organic substances and/or inorganic COD components polluting rivers, effects the treatment at high ratios of purification with highly satisfactory economy and, in this connection, provide a catalyst for the treatment of the waste water which exhibits a high catalytic activity and excels in durability and resistance to alkalis, a method for the production thereof, and a method for the treatment of a waste water by the use of the catalyst.

Still another object of this invention is to provide a catalyst for the treatment of a waste water which exhibits a high catalytic activity and excels in durability and resistance to alkalis, a method for the use of a catalyst for the treatment of a waste water which exhibits a high catalytic activity with respect particularly to organic nitrogen compounds, sulfur-containing compounds, and organic halogen compounds and excels in durability and resistance to alkalis, and a method for catalytic wet oxidation treatment of a waste water.

DISCLOSURE OF INVENTION

The objects mentioned above are accomplished by a catalyst for the treatment of a waste water, which catalyst comprises an oxide of manganese and an oxide of at least one metal selected from the group consisting of iron, titanium, and zirconium.

The objects are accomplished by a catalyst for the treatment of a waste water, which catalyst comprises an oxide of manganese, a composite oxide of iron and titanium, and/or a composite oxide of iron and zirconium.

The objects are accomplished by a catalyst for the treatment of a waste water, which catalyst comprises a composite oxide of manganese and at least one metal selected from the group consisting of iron, titanium, and zirconium.

The objects are accomplished by a catalyst for the treatment of a waste water, which catalyst comprises a composite oxide of manganese and at least one metal selected from the group consisting of iron, titanium, and zirconium and further an oxide and/or a composite oxide of at least one metal selected from the group consisting of iron, titanium, and zirconium.

The objects are accomplished by a catalyst for the treatment of a waste water, which catalyst comprises a composite oxide of manganese and at least one metal selected from the group consisting of iron, titanium, and zirconium and further an oxide of manganese.

The objects are accomplished by a catalyst for the treatment of a waste water, which catalyst comprises an oxide and/or a composite oxide of at least one metal selected from the group consisting of iron, titanium, and zirconium in addition to the catalyst mentioned above.

The objects are accomplished by a method for the production of a catalyst for the treatment of a waste water, which method comprises heat-treating a precursor of an oxide of manganese and a precursor of an oxide of at least one metal selected from the group consisting of iron, titanium, and zirconium in an oxidizing atmosphere at a temperature of not less than 300° C.

The objects are accomplished by a method for the production of a catalyst for the treatment of a waste water, which method comprises heat-treating a precursor of an oxide of manganese, a precursor of the composite oxide of iron and titanium, and/or a precursor of the composite oxide of iron and zirconium in an oxidizing atmosphere at a temperature of not less than 300° C.

The objects are accomplished by a method for the production of a catalyst for the treatment of a waste water, which method comprises heat-treating a precursor of a composite oxide of manganese and at least one metal selected from the group consisting of iron, titanium, and zirconium in an oxidizing atmosphere at a temperature of not less than 300° C.

The objects are accomplished by a method for the production of a catalyst for the treatment of a waste water, which comprises heat-treating a precursor of a composite oxides of manganese and at least one metal selected from the group consisting of iron, titanium, and zirconium or a catalyst obtained by heat-treating said precursor in an oxidizing atmosphere at a temperature of not less than 300° C. in combination with a precursor of the oxide and/or a precursor of the composite oxide of at least one metal selected from the group consisting of iron, titanium, and zirconium in an oxidizing atmosphere at a temperature of not less than 300° C.

The objects are accomplished by a method for the production of a catalyst for the treatment of a waste water, which comprises heat-treating either precursors of the composite oxides of manganese and at least one metal selected from the group consisting of iron, titanium, and zirconium or a catalyst obtained by heat-treating said precursors in an oxidizing atmosphere at a temperature of not less than 300° C. in combination with a precursor of the oxide and/or a precursor of the composite oxide of at least one metal selected from the group consisting of iron, titanium, and zirconium and further with a precursor of the oxide of manganese in an oxidizing atmosphere at a temperature of not less than 300° C.

The objects are accomplished by a method for the treatment of a waste water, which method comprises subjecting the waste water to a wet oxidation treatment with a molecular oxygen-containing gas in the presence of the catalyst under a pressure such that the waste water retain the liquid phase thereof at temperature of not less than 140° C. and less than 370° C.

BEST MODE FOR CARRYING OUT THE INVENTION

Figure 1:
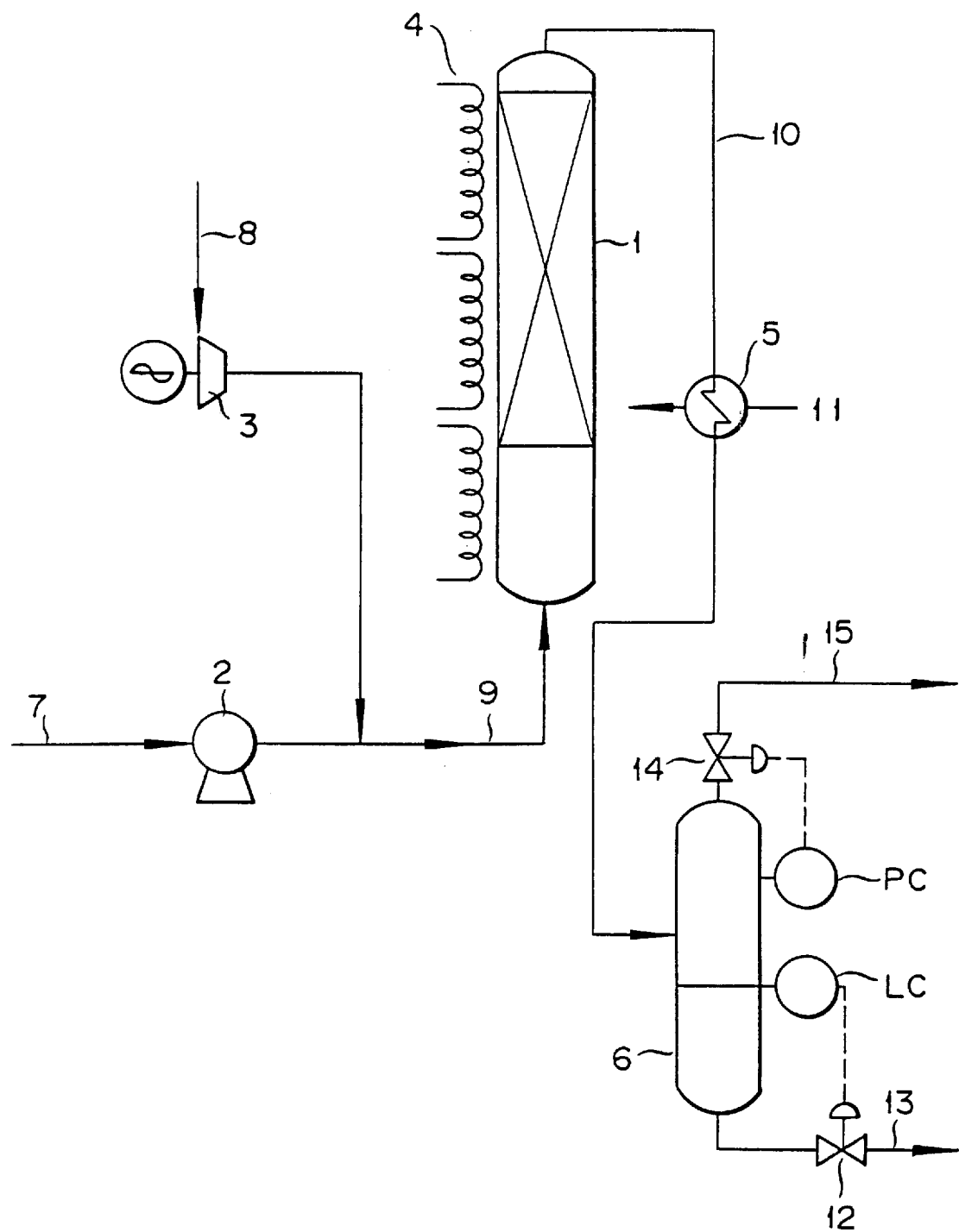
FIG. 1 is a flow chart showing one preferred embodiment of the method of treatment of a waste water according to this invention.

A first catalyst of this invention for the treatment of a waste water comprises an oxide of manganese and an oxide of at least one metal selected from the group consisting of iron, titanium, and zirconium. A combination of an oxide of manganese with an oxide of at least one metal selected from the group consisting of iron, titanium, and zirconium produces a catalyst which excels in catalytic activity and durability.

Though a ratio of the components in the catalyst is not specifically limited, the catalyst is particularly effective when it has a composition such that the oxide of manganese as $MnO_2$ accounts for a proportion in the range of from 0.05 to 50% by weight and the oxide of at least one metal selected from the group consisting of iron, titanium, and zirconium as $Fe_2O_3$, $TiO_2$, and $ZrO_2$ accounts, as a total, for a proportion in the range of from 99.95 to 50% by weight, desirably the oxide of manganese as $MnO_2$ accounts for a proportion in the range of from 0.5 to 30% by weight and the oxide of at least one metal selected from the group consisting of iron, titanium, and zirconium as $Fe_2O_3$, $TiO_2$, and $ZrO_2$ accounts, as a total, for a proportion in the range of from 99.5 to 70% by weight, and more preferably the oxide of manganese as $MnO_2$ accounts for a proportion in the range of from 1 to 20% by weight and the oxide of at least one metal selected from the group consisting of iron, titanium, and zirconium as $Fe_2O_3$, $TiO_2$, and $ZrO_2$ accounts, as a total, for a proportion in the range of from 99 to 80% by weight. If the proportion of the oxide of manganese as $MnO_2$ is less than 0.05% by weight, the catalyst, when used under the conditions contemplated by this invention for the catalytic wet oxidation treatment, will manifest no fully satisfactory activity. If the proportion exceeds 50% by weight, the catalyst, when used under the conditions contemplated by this invention for the catalytic wet oxidation treatment, will be at a disadvantage in suffering a decrease in the mechanical strength required by the catalyst for retaining the shape thereof in spite of a fully satisfactory activity. Thus, the proportion of the oxide of manganese and that of the oxide of at least one metal selected from the group consisting of iron, titanium, and zirconium are selected within the respective ranges mentioned above with due respect to the various conditions the catalyst is required to fulfil.

A second catalyst of this invention for the treatment of a waste water comprises an oxide of manganese, a composite oxide of iron and titanium, and/or a composite oxide of iron and zirconium. A combination of an oxide of manganese with a composite oxide of iron and titanium and/or a composite oxide of iron and zirconium produces a catalyst which excels in catalytic activity and durability.

Though a ratio of the components in the catalyst is not specifically limited, the catalyst is particularly effective when it has a composition such that the oxide of manganese as $MnO_2$ accounts for a proportion in the range of from 0.05 to 50% by weight and the composite oxide of iron and titanium and/or the composite oxide of iron and zirconium as $Fe_2O_3$, $TiO_2$, and $ZrO_2$ accounts, as a total, for a proportion in the range of from 99.85 to 50% by weight, preferably the oxide of manganese as $MnO_2$ accounts for a proportion in the range of from 0.5 to 30% by weight the composite oxide of iron and titanium and/or the composite oxide of iron and zirconium as $Fe_2O_3$, $TiO_2$, and $ZrO_2$ accounts, as a total, for a proportion in the range of from 99.5 to 70% by weight, preferably the oxide of manganese as $MnO_2$ accounts for a proportion in the range of from 0.5 to 30% by weight, and more preferably the oxide of manganese as $MnO_2$ accounts for a proportion in the range of from 1 to 20% by weight and the composite oxide of iron and titanium and/or the composite oxide of iron and zirconium as $Fe_2O_3$, $TiO_2$, and $ZrO_2$ accounts, as a total, for a proportion in the range of from 99 to 80% by weight. If the proportion of the oxide of manganese as $MnO_2$ is less than 0.05% by weight, the catalyst, when used under the conditions contemplated by this invention for the catalytic wet oxidation treatment, will manifest no fully satisfactory activity. If the proportion exceeds 50% by weight, the catalyst, when used under the conditions contemplated by this invention for the catalytic wet oxidation treatment, will be at a disadvantage in suffering a decrease in the mechanical strength required by the catalyst for retaining the shape thereof in spite of a fully satisfactory activity. Thus, the proportion of the oxide of manganese and that of the composite oxide of iron and titanium and/or that of the composite oxide of iron and zirconium are selected within the respective ranges mentioned above with due respect to the various conditions the catalyst is required to fulfil.

A third catalyst of this invention for the treatment of a waste water comprises a composite oxide of manganese and at least one metal selected from the group consisting of iron, titanium, and zirconium. The use of the composite oxide of manganese and at least one metal selected from the group consisting of iron, titanium, and zirconium produces a catalyst which excels in catalytic activity and durability.

Though a ratio of the components in the catalyst is not specifically limited, the catalyst is particularly effective when it has a composition such that the composite oxide of manganese as $MnO_2$ accounts for a proportion in the range of from 0.05 to 50% by weight and the composite oxide of at least one metal selected from the group consisting of iron, titanium and zirconium as $Fe_2O_3$, $TiO_2$, and $ZrO_2$ accounts, as a total, for a proportion in the range of from 99.85 to 50% by weight, preferably the composite oxide of manganese as $MnO_2$ accounts for a proportion in the range of from 0.5 to 30% by weight and the composite oxide of at least one metal selected from the group consisting of iron, titanium and zirconium as $Fe_2O_3$, $TiO_2$, and $ZrO_2$ accounts, as a total, for a proportion in the range of from 99.5 to 70% by weight, and more preferably the composite oxide of manganese as $MnO_2$ accounts for a proportion in the range of from 1 to 20% by weight and the composite oxide of at least one metal selected from the group consisting of iron, titanium and zirconium as $Fe_2O_3$, $TiO_2$, and $ZrO_2$ accounts, as a total, for a proportion in the range of from 99 to 80% by weight. If the proportion of the oxide of manganese as $MnO_2$ is less than 0.05% by weight, the catalyst, when used under the conditions contemplated by this invention for the catalytic wet oxidation treatment, will manifest no fully satisfactory activity. If the proportion exceeds 50% by weight, the catalyst, when used under the conditions contemplated by this invention for the catalytic wet oxidation treatment, will be at a disadvantage in suffering a decrease in the mechanical strength required by the catalyst for retaining the shape thereof in spite of a fully satisfactory activity. Thus, the proportion of the composite oxide of manganese and at least one metal selected from the group consisting of iron, titanium, and zirconium are selected within the respective ranges mentioned above with due respect to the various conditions the catalyst is required to fulfil.

A fourth catalyst of this invention for the treatment of a waste water comprises an oxide and/or a composite oxide of at least one metal selected from the group consisting of iron, titanium, and zirconium in addition to the third catalyst for the treatment of a waste water. A combination of a composite oxide of manganese and at least one metal selected from the group consisting of iron, titanium, and zirconium with an oxide and/or a composite oxide of at least one metal selected from the group consisting of iron, titanium, and zirconium produces a catalyst which excels in catalytic activity and durability.

Though a ratio of the components in the catalyst is not specifically limited, the catalyst is particularly effective when it has a composition such that the composite oxide of manganese as $MnO_2$ accounts for a proportion in the range of from 0.05 to 50% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99.85 to 50% by weight, preferably the composite oxide of manganese as $MnO_2$ accounts for a proportion in the range of from 0.5 to 30% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99.5 to 70% by weight, and more preferably the composite oxide of manganese as $MnO_2$ accounts for a proportion in the range of from 1 to 20% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99 to 80% by weight. If the proportion of the composite oxide of manganese as $MnO_2$ is less than 0.05% by weight, the catalyst, when used under the conditions contemplated by this invention for the catalytic wet oxidation treatment, will manifest no fully satisfactory activity. If the proportion exceeds 50% by weight, the catalyst, when used under the conditions contemplated by this invention for the catalytic wet oxidation treatment, will be at a disadvantage in s uffering a decrease in the mechanical strength required by the catalyst for retaining the shape thereof in spite of a fully satisfactory activity. Thus, the proportion of the composite oxide of manganese and that of the oxide and/or the composite oxide of at least one metal selected from the group consisting of iron, titanium, and zirconium are selected within the respective ranges mentioned above with due respect to the various conditions the catalyst is required to fulfil.

A fifth catalyst of this invention for the treatment of a waste water comprises an oxide of manganese in addition to the third or the fourth catalyst for the treatment of a waste water mentioned above. A combination of the oxide of manganese with the third or the fourth catalyst for the treatment of a waste water produces a catalyst which excels in catalytic activity and durability.

Though a ratio of the components in the catalyst is not specifically limited, the catalyst is particularly effective when it has a composition such that the oxide and the composite oxide of manganese as $MnO_2$ accounts for a proportion in the range of from 0.05 to 50% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99.85 to 50% by weight, preferably the oxide and the composite oxide of manganese as $MnO_2$ accounts for a proportion in the range of from 0.5 to 30% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99.5 to 70% by weight, and more desirably the oxide and the composite oxide of manganese as $MnO_2$ accounts for a proportion in the range of from 1 to 20% by weight and the oxide and/or the composite oxide of at least one metal selected from the group consisting of iron, titanium, and zirconium as $Fe_2O_3$, $TiO_2$, and $ZrO_2$ accounts, as a total, for a proportion in the range of from 99 to 80% by weight. If the proportion of the oxide and the composite oxide of manganese as $MnO_2$ is less than 0.05% by weight, the catalyst, when used under the conditions contemplated by this invention for the catalytic wet oxidation treatment, will manifest no fully satisfactory activity. If the proportion exceeds 50% by weight, the catalyst, when used under the conditions contemplated by this invention for the catalytic wet oxidation treatment, will be at a disadvantage in suffering a decrease in the mechanical strength required by the catalyst for retaining the shape thereof in spite of a fully satisfactory activity. Thus, the proportion of the oxide and the composite oxide of manganese and that of the oxide and/or the composite oxide of at least one metal selected from the group consisting of iron, titanium, and zirconium are selected within the respective ranges mentioned above with due respect to the various conditions the catalyst is required to fulfil.

The catalyst of this invention for the treatment of a waste water may incorporate in any of the first through the fifth catalyst mentioned above for the treatment of a waste water at least one metal selected from the group consisting of ruthenium, rhodium, palladium, iridium, and platinum and/or a compound of the metal.

The precious metals mentioned above function effectively in the catalyst when the amounts thereof incorporated in the catalyst are severally in the range of from 0.05 to 10 parts by weight, preferably from 0.1 to 2.5 parts by weight, based on 100 parts by weight of the total amount of the component oxides of the catalyst. If the amounts are less than 0.05 part by weight, the precious metals will have insufficient effects and fail to improve the activity of the catalyst. If the amounts exceed 10 parts by weight, the excesses will bring about no proportional increase in the quality of the catalyst and prove undesirable economically. Further, the excesses will go to degrade the durability of the catalyst and lower the mechanical strength of the catalyst.

All the catalysts according to this invention may possibly contain as extraneous matter therein such substances and impurities as are entrained by the precursors of the catalysts and such substances and impurities as are admitted in the catalysts in the process of production. As typical examples of the extraneous matter, silicon, aluminum, sulfur, halogens, sodium, potassium, calcium, magnesium, nitrogen, chromium, and nickel. If the catalysts of this invention contain these substances in minute amounts, their functions as a catalyst will not be impaired at all unless these substances produce an appreciable influence on the physical properties of the catalysts.

The catalysts according to this invention may be used as molded in various shapes such as, for example, pellets, granules, spheres, and rings. Optionally, they may be used as molded in a one-piece structure such as, for example, a honeycomb. They may be used, alternatively, as deposited on an inorganic oxide carrier or a metallic carrier which is formed in any of the various shapes mentioned above. When they are molded by molding, they may incorporate therein an inorganic oxide in preparation for the molding. The inorganic oxide which is used in this case may be mixed with the catalytic components according to this invention in the same manner as a molding auxiliary such as glass fibers.

The addition of this inorganic oxide is effective in improving the forming property, the mechanical strength, etc. of the catalysts.

As typical examples of the inorganic oxides, oxides of cobalt, nickel, chromium, copper, tin, niobium, barium, lanthanum, cerium, praseodymium, aluminum, silicon, sodium, and potassium, composite oxides of these elements, and glass fibers may be cited. Optionally, these inorganic oxides may be used as mixed with the catalytic components of this invention and formed by molding. In this case, the inorganic oxides thus added are effective in improving the forming property, the mechanical strength, etc. of the catalysts.

When such an inorganic oxide (excepting the oxides and/or composite oxides of such elements as titanium, zirconium, iron, and manganese) is used as mixed with the catalytic components and formed by molding, the amount of the inorganic oxide is preferable to be in the range of from 70 to 0.01% by weight, more preferably from 10 to 0.1% by weight, based on the total amount of the catalyst. If this amount exceeds 70% by weight, the excess will go to decrease the effect of the catalyst. If it is less than 0.01% by weight, the added inorganic oxide may well be regarded as part of impurities.

When such an inorganic oxide (excepting the oxides and/or composite oxides of such elements as titanium, zirconium, iron, and manganese) or a metallic carrier is used effectively as a means for supporting the catalytic component of this invention, the amount thereof is preferable to be in the range of from 99.5 to 20% by weight, more preferably from 95 to 50% by weight, based on the total amount of the catalyst. If this amount exceeds 99.5% by weight, the excess will go to degrade the effect of the catalyst. If it is less than 20% by weight, the inorganic oxide thus added will produce the effect of a carrier or the mechanical strength necessary for the maintenance of the shape of a catalyst only to an insufficient effect.

As the catalyst of the present invention in the shape of granules and spheres, the average particle diameter is preferable to be in the range of from 1 to 10 mm, preferably from 2 to 7 mm. If the average particle diameter is less than 1 mm, the reaction column packed with the catalyst will suffer an increase in pressure loss. Conversely, if exceeds 10 mm, the catalyst will fail to acquire a sufficient geometric surface area, suffer a decrease in the efficiency of contact, and produce no sufficient capacity for treatment.

As the case of the catalyst of this invention in the shape of pellets, the average diameter is in the range of from 1 to 10 mm, preferably from 3 to 8 mm, and the average length is in the range of from 2 to 15 mm, preferably from 3 to 10 mm. If the average diameter is less than 1 mm or the average length is less than 2 mm, the pressure loss will increase. Conversely, if the average diameter exceeds 10 mm or the average length exceeds 15 mm, the catalyst will fail to acquire a sufficient geometric surface area, suffer a decrease in the efficiency of contact, and produce no sufficient capacity for treatment.

As the catalyst of this invention in the shape of rings, the average outside diameter is in the range of from 4 to 15 mm, preferably from 6 to 12 mm, the average length is in the range of from 2 to 15 mm, preferably from 3 to 10 mm, and the average thickness is in the range of from 0.5 to 5 mm, preferably from 1 to 4 mm. If the average outside diameter is less than 4 mm or the average length is less than 2 mm, the pressure loss will increase and the forming property will be insufficient. If the average outside diameter exceeds 15 mm or the average length exceeds 15 mm, the catalyst will fail to acquire a sufficient geometric surface area, suffer a decrease in the efficiency of contact, and produce no sufficient capacity for treatment. If the average thickness is less than 0.5 mm, the mechanical strength of the catalyst will decrease in spite of the advantage that the pressure loss is lowered and the weight of the catalyst is decreased. If the average thickness exceeds 5 mm, the catalyst will fail to acquire a sufficient geometric surface area, suffer a decrease in the efficiency of contact, and produce no sufficient capacity for treatment in spite of the fact that the mechanical strength is sufficient.

As the catalyst of this invention is in the shape of a honeycomb, the equivalent diameter of the through hole is in the range of from 2 to 20 mm, the wall thickness of cell in the range of from 0.1 to 3 mm, and the opening ratio in the range of from 50to 90%. Preferably, the equivalent diameter of through hole is in the range of from 2.5 to 15 mm, the wall thickness of cell in the range of from 0.5 to 3 mm, and the opening ratio in the range of from 50 to 90%. If the equivalent diameter of through hole is less than 2 mm, the pressure loss will be unduly large. If this equivalent diameter exceeds 20 mm, the efficiency of contact will be degraded and the efficiency of adsorption will be unduly low in spite of the fact that the pressure loss is lowered. If the wall thickness of cell is less than 0.1 mm, the catalyst will be at a disadvantage in suffering a decrease in the mechanical strength of the catalyst in spite of the advantage that the pressure loss is lowered and the weight of the catalyst is decreased. If the wall thickness of cell exceeds 3 mm, the pressure loss will be possibly increased while the mechanical strength is sufficient. For the same reason as adduced above, the opening ratio is preferable to be in the range of from 50 to 90%.

A specific surface area of the catalyst of this invention measured by the Brunauer-Emmett-Teller (hereinafter referred to briefly as "BET") is preferable to be in the range of from 5 to 200 $m^2/g$, more preferable from 10 to 150 $m^2/g$, and most desirably from 30 to 120 $m^2/g$. If the specific surface area is less than 5 $m^2/g$, the efficiency of contact between the substance under treatment and the catalyst will be unduly low and the activity of the catalyst will be decreased. Conversely, if it exceeds 200 $m^2/g$, the catalyst will suffer a decrease in the mechanical strength.

Now, the method for the production of the catalyst of this invention for the treatment of a waste water will be described below.

The method for the production of the catalyst according to this invention is not specifically limited. Various methods are available for the production under discussion. In principle, the production is attained by mixing a compound containing elementary manganese with a compound containing elemental titanium and/or elemental zirconium and/or elemental iron, optionally drying the resultant mixture, and further calcining the mixture in an oxidizing atmosphere.

Incidentally, the steps of drying and calcination which follows the step of mixing are invariably performed in the same procedure in all the methods to be cited hereinbelow. These steps, therefore, will be omitted from the following description. The methods available for the mixing a compound containing elementary manganese with a compound containing elemental titanium and/or elemental zirconium and/or elemental iron will be specifically described below by way of example.

(A) A method of coprecipitation which effects the production by mixing the aqueous solution of a compound containing elemental manganese with the aqueous solution of a compound containing elemental titanium and/or elemental zirconium and/or a compound containing elemental iron and adjusting the pH value of the resultant mixed aqueous solution with an alkali such as aqua ammonia or the aqueous solution of sodium hydroxide thereby inducing coprecipitation of the compounds mentioned above in the form of a hydroxide.

(B) A kneading method which effects the production by intimately mixing a compound containing elemental manganese in the form of gel or solid hydroxide, nitrate, carbonate, organic acid salt, chloride, or oxide with a compound containing elemental titanium and/or elemental zirconium and/or elemental iron each in the form of gel or solid hydroxide, nitrate, organic acid salt, chloride, or oxide.

(C) A method of addition which effects the production either by adding the aqueous solution of a compound containing elemental manganese to a compound containing elemental titanium and/or elemental zirconium and/or elemental iron in the form of gel or solid hydroxide, nitrate, organic acid salt, chloride, or oxide or by adding the aqueous solution of a compound containing elemental titanium and/or elemental zirconium and/or elemental iron to a compound containing elemental manganese in the form of gel or solid of hydroxide, nitrate, organic acid salt, chloride, or oxide.

(D) A method of impregnation which effects the production by forming in a prescribed shape a compound containing elemental titanium and/or elemental zirconium and/or elemental iron in the form of oxide and impregnating the formed compound in the aqueous solution of a compound containing elemental manganese.

(E) A method which suitably combines the methods cited above.

When the catalytic system is preferable to incorporate therein elemental manganese and/or elemental titanium and/or elemental zirconium and/or elementary iron and a precious metal element as well, the incorporation may be made at any desired time in the course of any of the methods (A) through (E) mentioned above. That is, a compound containing elemental manganese and/or a compound containing elemental titanium and/or elemental zirconium and/or elemental iron or the compound containing a relevant element substituted therefor may be used. Further, the order in which the component compounds are added to the catalytic system may be suitably selected.

The catalyst according to this invention is at least one type to be selected from among (1) a type in which manganese and iron are made to form an oxide and/or a composite oxide in an intimately mixed state, (2) a type in which manganese and titanium and/or zirconium are made to form an oxide and/or a composite oxide in an intimately mixed state, and (3) a type in which manganese, iron, and titanium and/or zirconium are made to form an oxide and/or a composite oxide in an intimately mixed state. Thus, the catalyst particularly manifests peculiar physical properties which the individual oxides of the component elements of the catalyst are not observed to exhibit. It is, therefore, inferred that the catalyst, when used for treating a waste water, brings about the effect of conspicuously improving catalytic activity, durability, and resistance to alkalis and improving the mechanical strength of catalyst as well. When the catalyst according to this invention is analyzed by the X-ray diffraction, the diffraction pattern obtained of the catalyst shows no peak of the oxide apparently of manganese. If the pattern happens to show such a peak, this peak will have very low intensity as compared with the peak which a simple mixture of manganese oxide with other oxide produces in the X-ray diffraction pattern. It is inferred from this fact that the oxide of manganese involved in this invention forms a composite oxide with titanium and/or zirconium and/or iron instead of merely forming simple manganese oxide.

This invention, in one aspect thereof, concerns a catalyst which comprises a composite oxide of iron and titanium, a composite oxide of iron and zirconium, a composite oxide of titanium and zirconium, and a composite oxide of iron, titanium, and zirconium. The catalyst using these composite oxides possibly manifests peculiar physical properties which are not observed when the simple oxides are used independently. Particularly, the composite oxide of iron and titanium and/or zirconium manifests peculiar physical properties which are not observed when the simple oxides are used independently. When the catalyst using these composite oxides is molded in a prescribed shape, the catalyst consequently produced is characterized by acquiring high mechanical strength as compared with the equivalent catalyst using an oxide of iron. Then, the catalyst made of a composite oxide of titanium or zirconium with iron, when used for wet oxidation treatment, is characterized by excelling in resistance to alkalis and enjoying improved catalytic activity as compared with the equivalent catalyst using an oxide of titanium or an oxide of zirconium. For this reason, the catalyst according to this invention is more preferably used in the form of a composite oxide of relevant elements than in the form of simple oxides of the same elements.

The composite oxide of iron and titanium, the composite oxide of iron and zirconium, the composite oxide of titanium and zirconium, and the composite oxide of iron, titanium, and zirconium to be used in this case form the oxides each having component elements composited in an intimately mixed state. When these composites are analyzed by the X-ray diffraction, the X-ray diffraction patterns consequently obtained show peaks of composite oxides which are not obtained with the corresponding simple oxides. Otherwise, these peaks have low intensity as compared with the peaks similarly produced in the X-ray diffraction patterns by the oxides which are obtained by merely mixing the oxides prepared independently of each other. It is inferred from this fact that the oxides prepared by intimately mixing these elements constitute composite oxides.

As the precursor of the oxide of manganese in the catalyst according to this invention, various manganesecontaining compounds can be used. As typical examples of the manganese-containing compounds, compounds such as hydroxide, nitrate, carbonate, organic acid salts, chloride, and sulfate of manganese, oxides such as activated manganese dioxide and electrolyzed manganese dioxide, and composite oxides such as potassium permanganate may be cited. The precursors of the oxide of titanium or zirconium include compounds such as hydroxide, sulfate, and chloride, oxides such as titania and zirconia, and composite oxides such as barium titanate, for example. The precursors of the oxide of iron include compounds such as hydroxide, nitrate, organic acid salts, chloride, and sulfate and oxides such as ferrous oxide, ferric oxide, and triiron tetraoxide, for example. The raw materials for precious metal elements include compounds such as hydroxide, nitrate, carbonate, organic acid salts, chloride, sulfate, and oxide and metals, for example.

The method for molding the catalyst according to this invention is not specifically limited. The catalyst can be molded by various methods. A molding device befitting the shape in which the catalyst is destined to be molded can be used.

As respects the manufacture of the catalyst according to this invention, the method which produces the catalyst for the treatment of a waste water by heat-treating an oxide of manganese and/or a precursor of the oxide of manganese and an oxide of at least one element selected from the group consisting of titanium, zirconium, and iron and/or a precursor of the oxide obtained by any of the methods of preparation (A) through (E) mentioned above in an oxidizing atmosphere at a temperature in the range of from 300° to 550° C., preferably from 350° to 500° C. is adopted. Thus, in the preparation or the molding of the catalyst, it is particularly effective to calcine the precursor of the catalyst containing an oxide of manganese and/or a precursor of the oxide of manganese in an oxidizing atmosphere at a temperature of not less than 300° C. and not more than 550° C. The calcination in the oxidizing atmosphere is attained preferably under continued supply of an oxygen-containing gas, preferably air. The time to be spent for this calcination is preferable to be not less than 1 hour in view of the necessity for attaining uniform calcination. Preferably, the calcination temperature is in the range of from 350° to 500° C. and the calcination time in the range of from 1 to 5 hours. If the calcination temperature is less than 300° C. or the calcination time is less than one hour, the catalyst will be at a disadvantage in acquiring unduly low mechanical strength and exhibiting unduly low activity and this catalyst, when used particularly for wet oxidation treatment, will be at a disadvantage in possibly suffering the components thereof to dissolve in water initially. If the calcination temperature exceeds 550° C., the possibility ensues that the catalyst will exhibit unduly low activity and offer unduly low durability. The heat treatment of the catalyst composition in the oxidizing atmosphere in the course of the production of the catalyst according to this invention may be preparatorily carried out by the use of a calcination furnace. Otherwise, it may be carried out in a reaction column for wet oxidation after the catalyst has been packed in the reaction column. Thus, the timing for the heat treatment under discussion is not critical.

The oxide of manganese which is one of the components of the catalyst according to this invention does not easily permit accurate determination of the oxidation number thereof because it assumes the form of an oxide as intimately mixed with oxides severally of titanium and/or zirconium and/or iron. It is known that an oxide of manganese generally has the oxidation number thereof varied by a change in the calcination temperature. The oxidation number of this nature is required. On this basis, the oxidation number of manganese according to this invention can be estimated. To be specific, an oxide of manganese which has been calcined at a temperature higher than 550° C. is thought to be a product of lower order than one of manganese which has been calcined at a temperature lower than 550° C. An oxide of manganese which has been calcined at a temperature lower than 300° C. is thought to be a product of higher order than one of manganese which has been calcined at a temperature higher than 300° C. or to be a product which has not been transformed to an oxide and/or a composite oxide of manganese. It is inferred from this fact that the catalyst according to this invention is effective when the oxidation number of manganese in an oxide and/or a composite oxide of manganese in the catalyst, as reduced to the form of $MnO_x$, is in the range of x=1.5 to 2.0, preferably x=1.7 to 2.0. In other words, manganese is thought to assume an effective form when the oxidation number thereof is 3 or 4, preferably 4.

The oxide of manganese is capable of various modifications. The catalyst according to this invention is not restricted by this fact.

In this invention, the compound such as an oxide of at least one element selected from the group consisting of titanium, zirconium, and iron, in the process of the production of the catalyst of this invention containing no manganese, may be calcined at a temperature of higher than 500° C. or at a still higher temperature exceeding 550° C. The catalyst of this invention which is obtained in this case suffers a slight decrease in the catalytic activity and nevertheless enjoys an increase in the mechanical strength. Even in this case, the calcination is carried out effectively when the temperature thereof is not more than 800° C. If the calcination temperature exceeds 800° C., the catalyst will be at a disadvantage in contacting a substance under treatment with unduly low efficiency and exhibiting unduly low activity because the produced oxide and/or composite oxide acquires an unduly small specific surface area.

Now, the method for treating waste water by the use of the catalyst according to this invention will be described below.

The temperature for the catalytic wet oxidation treatment according to this invention is not less than 140° C. and less than 370° C., preferably not less than 150° C. and less than 300° C., and more preferably not less than 160° C. and less than 280° C. If the temperature of this treatment exceeds 370° C., the waste water will be no longer capable of retaining the liquid phase thereof. If it exceeds 300° C., the treatment will incur heavy cost of both plant and operation because it necessitates application of appreciable pressure to the site of treatment for the retention of the liquid phase of the waste water. If the temperature of the treatment is less than 140° C., the treatment of organic substances and inorganic COD components will be effected with unduly low efficiency and the purification of the waste water will be attained incompletely. If the temperature is less than 150° C., the waste water will more often than not defy thorough purification because the COD components and other substances are not fully decomposed.

The kinds of the oxygen-containing gas to be used in this invention is not specifically limited. Though such gases as oxygen and ozone are usable, the air which is inexpensive is advantageously used. Optionally, the oxygen-containing gas may be used as suitably diluted with an inert gas. Besides these gases, the oxygen-containing waste gas emanating from other plant may be suitably utilized.

The amount of the oxygen-containing gas to be used herein is suitably fixed, depending on the concentration of the waste water under treatment. Generally, it is 0.3 to 5 times, preferably 1.0 to 3 times, the amount of oxygen required for thorough conversion of the COD components and other substances in the waste water into water, carbon dioxide gas, inorganic salts, ashes, and so on. If this amount exceeds 5 times the amount of oxygen, there will ensue redundant supply of oxygen. If it is less than 0.3 times the amount of oxygen, the purification of the waste water will be incomplete because of shortage of oxygen supply. If this amount falls in the range of from 0.3 to 1.0 times the amount of oxygen, the oxygen-containing gas will supply no sufficient oxygen for thorough conversion of the COD components and other substances in the waste water into water, carbon dioxide gas, inorganic salts, ashes, and so on. Since the efficiency of treatment of COD in the ordinary wet oxidation treatment is less than 100%, the oxygen supplied by the oxygen-containing gas used in an amount 1.0 times the amount of oxygen needed is not wholly used eventually but often produces a residue in the treated waste gas. When the amount of oxygen so supplied in this case is decreased to below 1.0 times the amount of oxygen needed in conformity with the actual efficiency of treatment, the treatment incurs no hindrance so long as the state of oxygen surplus is retained after the end of the treatment.

The amount of the waste water to be treated by the use of the catalyst according to this invention generally falls in the range of from 0.1 to 10 $hr^{-1}$, preferably from 0.5 to 5 $hr^{-1}$, in terms of liquid hourly space velocity. If the liquid hourly space velocity exceeds 10 $hr^{-1}$, the efficiency of treatment of the waste water will be unduly low. If the liquid hourly space velocity is less than 0.1 $hr^{-1}$, the amount of the waste water to be treated will be unduly small and the facility will be unduly large.

The pH value to be used for the wet oxidation treatment of a waste water by the use of the catalyst according to this invention is not specifically limited but may be suitably set. Particularly the catalyst of this invention is advantageously used for treating waste water whose pH value is in the alkaline zone because it is characterized by excelling in resistance to alkalis as compared with the conventional catalyst. The catalyst is preferable to be used at a pH value of not less than 6, preferably at a pH value of not less than 7.5. The same remark holds good for the pH value of the waste water which has undergone the wet oxidation treatment and the pH value of the waste water which is in the process of the wet oxidation treatment. Thus, the waste water is preferable to be used at a pH value of not less than 6, preferably at a pH value of not less than 7.5.

Generally, the pipes, reaction vessel, etc. to be used for the catalytic wet oxidation treatment are made of stainless steel and so forth. Thus, they pose a problem of corrosion when the treatment is carried out in the acidic zone. The waste water, therefore, is preferable to be adjusted to a pH value in the alkaline zone before it is subjected to the treatment. Many conventional catalysts, when used in a waste water which has a pH value in the alkaline zone, entail the problem of exhibiting lower activity than when the waste water has a pH value in the acidic zone. The catalyst according to this invention, however, is at an advantage in being effectively usable in the alkaline zone because it is characterized by excellent resistance to alkalis and high activity as well. As a result, the plant used for the treatment offers improved resistance to corrosion because the waste water is allowed to have the pH value thereof adjusted in the zone of high alkalinity.

The resistance offered by the material of the plant to corrosion has heretofore posed a problem particularly when waste water to be treated contains halogen-containing compounds such as chlorine ion, bromine ion, and organic halogen-containing compounds; sulfur-containing compounds such as thiosulfuric acid ion, sulfurous acid ion, sulfides, and organic sulfur-containing compounds; and nitrogen-containing compounds such as nitric acid ion, nitrous acid ion, ammonium ion, and organic nitrogen compounds. The catalyst according to this invention functions effectively even when the waste water contains these compounds.

Although the upper limit of the pH value allowed for the wet oxidation treatment of a waste water by the use of the catalyst according to this invention is not particularly specified, the pH value after wet oxidation treatment is preferably not more than 12, more preferably not more than 10. If the treated waste water has a pH value of more than 12, the treatment which has afforded this waste water will possibly suffer unduly low efficiency as compared with the treatment which affords a treated waste water having a pH value of not more than 10. When the treated waste water is to be released into a river, for example, and it happens to have high alkalinity, it must be treated for pH adjustment necessary for neutralizing the alkalinity. When the treated waste water has a high pH value, the treatment entails the problem of increasing the amount of an acid to be used for the neutralization. When the material of stainless steel and so forth is used for the reaction column and so forth and the pH value of the waste water under treatment is higher than 12, the material of the reaction column has a problem of alkali corrosion.

Some of the conventional catalysts betray poor durability particularly in the treatment of waste water which contains such organic nitrogen compounds as amine compounds, amide compounds, and amino acid compounds, waste water which contains. such sulfur-containing compounds as organic sulfur compounds, and waste water which contains organic halogen compounds. In the treatment of such waste water, the catalyst according to this invention manifests satisfactory durability and treats the waste water with high efficiency.

The adjustment of the pH value of the waste water is not particularly restricted but may be effected by suitable addition of sodium hydroxide, potassium hydroxide, sodium carbonate, or an aqueous solution thereof. Such an acidic reagent as sulfuric acid which is used for the adjustment of a pH value may be added when necessary. The kind of reagent to be adopted is irrelevant. Further, the method for the addition of such a pH adjusting reagent as mentioned above is not particularly defined. The pH adjustment may be carried out by having the reagent added to the stock tank for the waste water in advance of the treatment or by continuing the supply of the reagent to the reaction column by means of a feed pump.

The treated liquid which results from the treatment of a waste water with the catalyst according to this invention may be suitably adjusted in the same manner as described above to a pH value fit for release into a river or for an aftertreatment. The pH adjustment to be made herein is not specifically defined but may be effected by the addition of sodium hydroxide, potassium hydroxide, sodium carbonate, or sulfuric acid, or an aqueous solution thereof. No particular restriction is imposed on the method for implementing the addition.

This invention does not particularly prohibit a waste water from being treated by the conventional method of purification in advance of the treatment by the use of the catalyst according to this invention. In the catalytic wet oxidation treatment, for example, the waste water may be given a purifying treatment intended for the removal of heavy metals, calcium, magnesium, silicon, aluminum, and phosphorus which are responsible for the formation of scale. To be specific, the removal of these mischievous substances may be attained by the method of adsorptive separation using activated carbon, inorganic adsorbent, organic macromolecular material, etc. or the method of electrodialysis, for example. Otherwise the waste water may be subjected to a purifying treatment intended to separate and remove solid substances from the waste water. Alternatively, a purifying treatment may be carried out by the wet oxidation method without catalyst for the purpose of decomposing organic substances and inorganic COD components.

The treated liquid which results from the treatment of waste water by the catalyst according to this invention may be given an aftertreatment by the conventional purifying method. Even when the treated liquid resulting from the execution of this invention is to be subjected to a biological treatment or a chemical treatment, the harmful substances have been mostly removed from the waste water and the COD components of the waste water have been decreased to a fair extent. Further, the COD components and nitrogen compounds which still persist in the treated liquid resulting from the treatment of this invention are capable of being very easily decomposed in the biological or the chemical treatment. Thus, they impose only very small load on the facilities for the biological or the chemical treatment. The COD components and such nitrogen compounds as nitric acid ion and nitrous acid ion, therefore, can be easily disposed. When the treated liquid is to be deprived of phosphorus and other substances by such a procedure as comprises adding a calcium compound to the treated liquid thereby insolubilizing the phosphorus and removing the insolubilized phosphorus, the removal is easily accomplished because the phosphorus compound has been already decomposed until phosphoric acid ion.

When the method according to this invention is adopted for the treatment, since the site for area of the facility is small and the facility is compact, the facilities for the treatment are small as compared with the conventional facilities for the treatment of waste water such as, for example, facilities for a biological treatment or those for a combustion treatment. Further, the treatment by the method of this invention is simple in terms of process itself and advantageous in terms of investment for the facility and cost of operation.

The catalyst according to this invention can be suitably washed. The method to be used for washing the catalyst is not particularly restricted. The catalyst can be washed by the use of, for example, water and an alkaline aqueous solution. Preferably, the washing is effectively carried out by using the alkaline aqueous solution. Though use of water alone suffices to remove the scale which is physically adhering to the catalyst, it encounters difficulty in removing the scale which is strongly adsorbed physically or adsorbed chemically to the catalyst. This explains why the alkaline aqueous solution is used. Even in this case, the catalyst according to this invention is not deteriorated by the washing.

The alkaline aqueous solution to be used as the detergent in this case is not specifically defined. Various alkaline aqueous solutions such as, for example, aqueous sodium hydroxide solution, aqueous potassium hydroxide solution, and aqueous sodium carbonate solution may be used. These detergents are selectively used depending on the kind of substance deposited on the catalyst to be washed. Generally, it is desirable to use the aqueous sodium hydroxide solution.

As respects the concentration of the alkaline aqueous solution, the aqueous sodium hydroxide solution, for example, gives an effective washing to the catalyst when the concentration of sodium hydroxide is not less than 1 g/liter, preferably not less than 10 g/liter, of the detergent. If the concentration of sodium hydroxide is less than 1 g/liter, the effect of washing will be remarkably low. If this concentration is not less than 10 g/liter, the amount of the detergent will be unduly large and the treatment which follows the step of washing will be complicated and, for the purpose of quickly completing the washing treatment, the treating temperature will have to be elevated to a relatively high level. The concentration of sodium hydroxide is preferable to be less than 400 g/liter, preferably less than 300g/liter. If this concentration exceeds 400 g/liter, the viscosity of the detergent will increase to a point where the detergent is not easily supplied. When the sodium hydroxide of this concentration is used at an elevated temperature, the material of the plant will offer unduly low resistance to corrosion.

Though the temperature at which the washing by the use of an alkaline detergent is carried out has no particular restriction, it is desired to be in the range of from 50° C. to 300° C., preferably from 130° C. to 270° C. If the treating temperature is unduly low, the washing effect will be poor and the washing time will be unduly long. While the washing time is decreased and the washing power is increased in proportion as the temperature is heightened, the washing must be carried out at the temperature mentioned above under such pressure as is required for enabling the detergent to retain the liquid phase thereof. If the washing temperature is unduly high, the operating cost will be increased and the ability of the material of the plant to resist corrosion will be degraded.

The pressure under which the catalyst is washed is suitably selected, depending on the relation between this pressure and the washing temperature. It has no particular restriction except for the requirement that it be sufficient for enabling the detergent to retain the liquid phase thereof.

The washing contemplated by this invention is not limited particularly but may be carried out by a method of continuous washing which resides in washing the catalyst with the detergent kept in a constantly flowing state or by a method of batchwise washing which resides in allowing the catalyst packed in a container to stand at rest for a prescribed time in the detergent held simultaneously in the container and subsequently extracting the washed catalyst from time to time.

The COD concentration in the waste water to be treated by the present invention is not particularly restricted but, for the sake of effective treatment, may be in the range of from 1 to 200 g/liter, preferably from 10 to 100 g/liter. If the COD concentration exceeds 200 g/liter, the heat of -oxidation of COD will be remarkably increased and, as a result, the control of the facility for the treatment will be attained only with difficulty. If it exceeds 100 g/liter, the heat of COD oxidation will be so large as to require a facility of a cooling device and incur an increase of cost. If it is less than 1 g/liter, the supply of the heat required for elevating the temperature will have to rely substantially wholly on a heat supply device. If it is less than 10 g/liter, the heat of COD oxidation will be small. Even when a heat exchanger is used as an accessorial unit for heat recovery, the self-supporting operation of a plant for wet oxidation treatment relying solely on the recovered heat will often prove difficult.

More often than not in this case, the operation necessitates plant of an independent heat supply device and, therefore, proves relatively disadvantageous from the viewpoint of energy consumption.

The facility for wet oxidation treatment to be packed with the catalyst according to this invention, namely the facility for catalytic wet oxidation treatment, is a standard facility in popular use. The treating column or the reaction column may be of a single-tube type or a shell-and-tube type. Depending on the components contained in waste water subjected to treatment and the contents thereof, one or more single-tube type or shell-and-tube type reaction columns may be operated under conditions fit for the treatment.

This invention adopts a method for the treatment of waste water, which method comprises subjecting the waste water to wet oxidation treatment using the catalyst according to this invention under such pressure as enables the waste water to retain the liquid phase thereof intact while continuing supply of an oxygen-containing gas.

Now, this invention will be specifically described below with reference to examples of the preparation of catalyst, examples of the formation of catalyst, and examples of the treatment of waste water cited as embodiments of this invention and examples of the preparation of catalyst and examples of the treatment of waste water cited as controls. It should be noted, however, that this invention is not limited to the working examples.

EXAMPLE 1

An oxide and/or a composite oxide of manganese and iron was prepared by the following method.

In 100 liters of water, 9.10 kg of ferric nitrate [$Fe(NO_3)_3 \cdot 9H_2O$] was dissolved. The resultant solution and 0.80 liter of an aqueous manganese nitrate [$Mn(NO_3)_2$] solution (equivalent to 250 g of $MnO_2$ per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 500° C. for 3 hours. The resultant composite oxide powder was found by the fluorescent X-ray method to be composed of $MnO_2$ and $Fe_2O_3$-at a weight ratio of 10:90. By the BET method, it was found to have a specific surface area of 51 $m^2/g$. When it was analyzed by the X-ray diffraction for crystal structure of the oxide of manganese, the diffraction pattern showed no grating of the oxide of manganese.

EXAMPLE 2

An oxide and/or a composite oxide of manganese, iron, and titanium was prepared by the following method. As a titanium source, an aqueous sulfuric acid solution having the following composition was used.

| | |
|---|---|
| $TiOSO_4$ | 250 g/liter (as $TiO_2$) |
| Total $H_2SO_4$ | 1,100 g/liter |

In 100 liters of water, 7.08 kg of ferric nitrate [$Fe(NO_3)_3 \cdot 9H_2O$] was dissolved. The resultant solution and 0.80 liter of an aqueous manganese nitrate [$Mn(NO_3)_2$] solution (equivalent to 250 g of $MnO_2$ per liter) added thereto were thoroughly mixed. The produced mixture was kept stirred at a temperature of 30° C. and aqua ammonia was gradually added thereto dropwise until pH 8. The neutralized mixture was left standing. for 15 hours to induce precipitation (gel). The aqueous solution of this gel was kept stirred again at a temperature of 30° C. and 1.60 liters of the aqueous sulfuric acid solution of titanyl sulfate of the composition mentioned above was added thereto and aqua ammonia was further added gradually thereto dropwise until pH 8. The produced mixture was left standing for 15 hours to induce precipitation (gel). This gel was separated by filtration, washed with water, and dried at 120° C. for 10 hours. Then, the dried product was calcined under an atmosphere of air at 500° C. for 3 hours. The resultant powder was found by the fluorescent X-ray method to be composed of $MnO_2$, $Fe_2O_3$, and $TiO_2$ at a weight ratio of 10:70:20. By the BET method, it was found to have a specific surface area of 65 $m^2/g$. When it was analyzed by the X-ray diffraction for crystal structure of the oxide of manganese, the diffraction pattern showed no grating of the oxide of manganese. Subsequently, the powder thus obtained was processed by the following method to obtain a catalyst.

EXAMPLE 3

By the use of a kneader, the powder obtained in Example 2 and starch were mixed. with water and thoroughly kneaded. The blend was molded in the form of pellets having an average particle diameter of 5 mm and an average length of 6 mm by means of a molding device. The pellets were calcined under an atmosphere of air at 450° C. for 3 hours. The catalyst consequently obtained was found by the BET method to have a specific surface area of 65 $m^2/g$.

EXAMPLE 4

In 100 liters of water, 7.08 kg of ferric nitrate [$Fe(NO_3)_3$ $9H_2O$] and 0.87 kg of zirconium oxynitrate [$ZrO(NO_3)_2$ $2H_2O$] were dissolved. The resultant solution and 0.80 liter of an aqueous manganese chloride [$MnCl_2$] solution (equivalent to 250 g of $MnO_2$ per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 480° C. for three hours. The resultant powder was found by the fluorescent X-ray method to be composed of $MnO_2$, $Fe_2O_3$, and $ZrO_2$ at a weight ratio of 10:70:20. By the BET method, it was found to have a specific surface area of 60 $m^2/g$. When it was analyzed by the X-ray diffraction for crystal structure of the oxide of manganese, the diffraction pattern showed no grating of the oxide of manganese. Subsequently, the powder thus obtained was processed by the same method as described in Example 3 to form a catalyst.

EXAMPLE 5

In 100 liters of water, 7.28 kg of ferric nitrate [$Fe(NO_3)_3 \cdot 9H_2O$] and 0.52 kg of zirconium oxynitrate [$ZrO(NO_3)_2$ $2H_2O$] were dissolved. The resultant solution and 0.32 liter of an aqueous manganese nitrate [$Mn(NO_3)_2$] solution (equivalent to 250 g of $MnO_2$ per liter) and 0.96 liter of an aqueous sulfuric acid solution of titanyl sulfate added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 480° C. for three hours. The resultant powder was found by the fluorescent X-ray method to be composed of $MnO_2$, $Fe_2O_3$, $TiO_2$, and $ZrO_2$ at a weight ratio of 4:72:12:12. By the BET method, it was found to have a specific surface area of 65 $m^2/g$. When it was analyzed by the X-ray diffraction for crystal structure of the oxide of manganese, the diffraction pattern showed no grating of the oxide of manganese. Subsequently, the powder thus obtained was processed by the same method as described in Example 3 to form a catalyst.

EXAMPLE 6

In 100 liters of water, 8.90 kg of ferric nitrate [$Fe(NO_3)_3 \cdot 9H_2O$] was dissolved. The resultant solution and 0.80 liter of an aqueous sulfuric acid solution of titanyl sulfate added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, combined with 0.040 kg of activated manganese dioxide powder, kneaded thoroughly by the use of a kneader, and dried at 120° C. for 10 hours. Then, the dried product was calcined under an atmosphere of air at 450° C. for 4 hours. The powder was found by the fluorescent X-ray method to be composed of $MnO_2$, $Fe_2O_3$, and $TiO_2$ at a weight ratio of 2:88:10. By the BET method, it was found to have a specific surface area of 63 m$^2$/g. When it was analyzed by the X-ray diffraction for crystal structure of the oxide of manganese, the diffraction pattern showed a peak conforming to β-$MnO_2$. The intensity of this peak in the diffraction pattern was very small as compared with that of the diffraction peak of the β-$MnO_2$ formed by the following method and analyzed similarly by the X-ray diffraction method. The intensity ratio was about 1/5.

The sample used for comparison by the X-ray diffraction method was obtained by simply mixing thoroughly a product produced by calcining 0.040 kg of the aforementioned activated manganese dioxide powder at 450° C. for 4 hours with 1.96 kg of a powder of an oxide and/or a composite oxide of iron and titanium produced by calcining at 450° C. for 4 hours a precipitate (gel) formed from ferric nitrate and an aqueous sulfuric acid solution of titanyl sulfate prepared in the same manner as described above.

Subsequently, the powder consequently obtained was processed by the same method as described in Example 3 to form a catalyst.

EXAMPLE 7

With 100 liters of water, 2.00 liters of an aqueous sulfuric acid solution of titanyl sulfate added thereto was thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration and washed with water. Separately, in a kneader, 1.52 kg of a hydroxide of iron (FeOOH) and 0.56 liter of an aqueous manganese nitrate [$Mn(NO_3)_2$] solution (equivalent to 250 g of $MnO_2$ per liter) were combined and thoroughly kneaded. The resultant blend and the cleaned gel obtained as described above were combined and thoroughly kneaded and then dried at 120° C. for 10 hours. Then, the dried product was calcined under an atmosphere of air at 450° C. for 4 hours. The powder was found by the fluorescent X-ray method to be composed of $MnO_2$, $Fe_2O_3$, and $TiO_2$ at a weight ratio of 7:68:25. By the BET method, it was found to have a specific surface area of 70 m$^2$/g. When it was analyzed by the X-ray diffraction for crystal structure of the oxide of manganese, the diffraction pattern showed no grating of the oxide of manganese. Subsequently, the powder consequently obtained was processed by the same method as described in Example 3 to form a catalyst.

EXAMPLE 8

With 100 liters of water, 1.60 liters of an aqueous sulfuric acid solution of titanyl sulfate added thereto was thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration and washed with water. Separately, in a kneader, 1.34 kg of a hydroxide of iron (FeOOH) and 0.53 kg of manganese carbonate [$MnCO_3$] were combined and thoroughly kneaded. The resultant blend and the cleaned gel obtained as described above were combined and thoroughly kneaded in the kneader and then dried at 120° C. for 10 hours. Then, the dried product was calcined under an atmosphere of air at 350° C. for 4 hours. The powder was found by the fluorescent X-ray method to be composed of $MnO_2$, $Fe_2O_3$, and $TiO_2$ at a weight ratio of 20:60:20. By the BET method, it was found to have a specific surface area of 92 m$^2$/g. When it was analyzed by the X-ray diffraction for crystal structure of the oxide of manganese, the diffraction pattern showed no grating of the oxide of manganese. Subsequently, the powder consequently obtained was processed by following the same method as described in Example 3 while changing the calcination temperature to 330° C. to form a catalyst.

EXAMPLE 9

In 100 liters of water, 9.00 kg of ferric nitrate [$Fe(NO_3)_3 \cdot 9H_2O$] was dissolved. The produced solution and 0.80 liter of an aqueous sulfuric acid solution of titanyl sulfate added thereto were thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 700° C. for 5 hours. The powder consequently obtained was found by the fluorescent X-ray method to be composed of $Fe_2O_3$ and $TiO_2$ at a weight ratio of 90:10. Subsequently, the powder consequently obtained was molded by the same method as described in Example 3.

The amount 1.98 kg of the pellets consequently obtained were impregnated with 0.40 liter of an aqueous manganese nitrate [$Mn(NO_3)_2$] solution (equivalent to 50 g of $MnO_2$ per liter). The impregnated pellets were dried at 120° C. for 10 hours. The dried product was calcined under an atmosphere of air at 480° C. for 3 hours. By the BET method, the calcined product was found to have a specific surface area of 34 m$^2$/g. When it was analyzed by the X-ray diffraction for crystal structure of the oxide of manganese, the diffraction pattern showed no grating of the oxide of manganese. By the fluorescent X ray method, the catalyst was found to be composed of $MnO_2$, $Fe_2O_3$, and $TiO_2$ at a weight ratio of 1:89:10.

EXAMPLE 10

In 100 liters of water, 7.08 kg of ferric nitrate [$Fe(NO_3)_3 \cdot 9H_2O$] was dissolved. The resultant solution and 0.80 liter of an aqueous manganese nitrate [$Mn(NO_3)_2$] solution (equivalent to 250 g of $MnO_2$ per liter) and 1.20 liters of an aqueous palladium sulfate solution (equivalent to 5 g of Pd per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). The aqueous solution of this gel was kept stirred again at a temperature of 30° C. and 1.60 liters of the aqueous sulfuric acid solution of titanyl sulfate of the composition mentioned above was added thereto and aqua ammonia was further added gradually thereto dropwise until pH 8. The produced mixture was left standing for 15 hours to induce precipitation (gel). This gel was separated by filtration, washed with water, and dried at 120° C. for 10 hours. Then, the dried product was calcined under an atmosphere of air at 500° C. for 3 hours. The resultant powder was found by the fluorescent X-ray method to be composed of $MnO_2$, $Fe_2O_3$, and $TiO_2$ at a weight ratio of 10:70:20:0.3. By the BET method, it was found to have a specific surface area of 68 m$^2$/g. When it was analyzed by the X-ray diffraction for crystal structure of the oxide of manganese, the diffraction pattern showed no grating of the oxide of manganese. The powder thus obtained was subsequently processed by the same method as described in Example 3 to obtain a catalyst.

EXAMPLE 11

In 100 liters of water, 7.08 kg of ferric nitrate [Fe(NO$_3$)$_3$·9H$_2$O] and 0.52 kg of zirconium oxynitrate [ZrO(NO$_3$)$_2$·2H$_2$O] were dissolved. The resultant solution and 0.80 liter of an aqueous manganese nitrate [Mn(NO$_3$)$_2$] solution (equivalent to 250 g of MnO$_2$ per liter) and 4.00 liters of an aqueous ruthenium nitrate solution (equivalent to 5 g of Ru per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of MnO$_2$, Fe$_2$O$_3$, ZrO$_2$, and Ru at a weight ratio of 10:70:20:1.0. By the BET method, it was found to have a specific surface area of 65m$^2$/g. When it was analyzed by the X-ray diffraction for crystal structure of the oxide of manganese, the diffraction pattern showed no grating of the oxide of manganese. Subsequently, the powder thus obtained was processed by following the method described in Example 3 while changing the firing temperature to 400° C. to mold a catalyst.

EXAMPLE 12

In 100 liters of water, 8.60 kg of ferric nitrate [Fe(NO$_3$)$_3$·9H$_2$O] was dissolved. The resultant solution and 0.40 liter of an aqueous manganese nitrate [Mn(NO$_3$)$_2$] solution (equivalent to 250 g of MnO$_2$ per liter) and 0.80 liter of an aqueous platinum nitrate solution (equivalent to 5 g of Pt per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). The aqueous solution of this gel was kept stirred again at a temperature of 30° C. and 0.80 liter of the aqueous sulfuric acid solution of titanyl sulfate of the composition mentioned above was added thereto and aqua ammonia was further added gradually thereto dropwise until pH 8. The produced mixture was left standing for 15 hours to induce precipitation (gel). This gel was separated by filtration, washed with water, and dried at 120° C. for 10 hours. Then, the dried product was calcined under an atmosphere of air at 350° C. for 4 hours. The resultant powder was found by the fluorescent X-ray method to be composed of MnO$_2$, Fe$_2$O$_3$, TiO$_2$, and Pt at a weight ratio of 5:85:10:0.2. By the BET method, it was found to have a specific surface area of 80 m$^2$/g. When it was analyzed by the X-ray diffraction for crystal structure of the oxide of manganese, the diffraction pattern showed no grating of the oxide of manganese. Subsequently, the powder thus obtained was processed by following the method of Example 3 while changing the calcination temperature to 330° C. to form a catalyst.

EXAMPLE 13

With 100 liters of water, 1.60 liters of an aqueous sulfuric acid solution of titanyl sulfate added thereto was thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration and washed with water. Then, in a kneader, 1.68 kg of a hydroxide of iron (FeOOH) and the gel obtained as described above were combined and thoroughly kneaded. The resultant blend was calcined under an atmosphere of air at 600° C. for 3 hours and further pulverized to obtain a powder. The powder consequently obtained was further processed by following the method of Example 3 while changing the firing temperature to 500° C. to obtain pellets of the same composition as mentioned above. The pellets were impregnated with 2.00 liters of an aqueous manganese nitrate [Mn(NO$_3$)$_2$] solution (equivalent to 50 g of MnO$_2$ per liter) and 5.00 liters of an aqueous iridium chloride solution (equivalent to 2 g of Ir per liter). The impregnated pellets were dried at 120° C. for 10 hours. Then, the dried pellets were calcined under an atmosphere of air at 400° C. for 3 hours. The resultant powder was found by the fluorescent X-ray method to be composed of MnO$_2$, Fe$_2$O$_3$, TiO$_2$, and Ir at a weight ratio of 5:75:20:0.5. By the BET method, it was found to have a specific surface area of 45 m$^2$/g. When it was analyzed by the X-ray diffraction for crystal structure of the oxide of manganese, the diffraction pattern showed no grating of the oxide of manganese.

EXAMPLE 14

In 100 liters of water, 9.10 kg of ferric nitrate [Fe(NO$_3$)$_3$·9H$_2$O] was dissolved. The resultant solution and 0.80 liter of an aqueous manganese nitrate [Mn(NO$_3$)$_2$] solution (equivalent to 250 g of MnO$_2$ per liter) and 2.00 liters of an aqueous rhodium nitrate solution (equivalent to 5 g of Rh per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 300° C. for 5 hours. The resultant powder was found by the fluorescent X-ray method to be composed of MnO$_2$, Fe$_2$O$_3$, and Rh at a weight ratio of 10:90:0.5. By the BET method, it was found to have a specific surface area of 60 m$^2$/g. When it was analyzed by the X-ray diffraction for crystal structure of the oxide of manganese, the diffraction pattern showed no grating of the oxide of manganese.

Control 1A

The gel obtained by the same method as described in Example 2 was separated by filtration, washed with water, and dried at 120° C. for 10 hours. Then, the dried gel was calcined under an atmosphere of air at 600° C. for 3 hours. The produced powder was found by the fluorescent X-ray method to be composed of Mn$_2$O$_3$, Fe$_2$O$_3$, and TiO$_2$ at a weight ratio of 9.2:70.6:20.2. By the BET method, it was found to have a specific surface area of 43 m$^2$/g. When it was analyzed by the X-ray diffraction for crystal structure of the oxide of manganese, the diffraction pattern showed no grating of the oxide of manganese. The powder consequently obtained was subsequently processed by the same method as described in Example 3 to form a catalyst.

Control 1B

A powder obtained by following the method of Example 6 while changing the calcination temperature of the powder to 600° C. wasmolded by the same method as described in Example 3. The produced powder was found by the fluorescent X-ray method to be composed of $Mn_2O_3$, $Fe_2O_3$, and $TiO_2$ at a weight ratio of 1.8:88.2:10. By the BET method, it was found to have a specific surface area of 38 m²/g. When it was analyzed by the X-ray diffraction for oxide of manganese, the diffraction pattern showed a peak conforming to $\alpha$-$Mn_2O_3$. The intensity of this peak in the diffraction pattern was very small as compared with that of the diffraction peak of the $\alpha$-$Mn_2O_3$ formed by the following method and analyzed similarly by the X-ray diffraction method. The intensity ratio was about 1/6. The sample used for the comparison had been prepared by thoroughly mixing 0.982 kg of a powder obtained by producing a gel containing iron and titanium by the same method as described in Example 6, drying the gel at 120° C. for 10 hours, and calcining the dried gel under an atmosphere of air at 600° C. for three hours with 0.018 kg of a powder obtained by firing at 600° C. for three hours the same powder of activated manganese dioxide as used in Example 6.

Control 1

A powder was obtained by following the procedure of Example 1 while omitting the use of the aqueous manganese nitrate solution. By the fluorescent X-ray method, the powder was found to be composed of 100% of $Fe_2O_3$.

Control 2

A powder was obtained by following the procedure of Example 2 while omitting the use of the aqueous manganese nitrate solution and then processed by the same method as described in Example 3 to obtain a molded powder. By the fluorescent X-ray method, the powder was found to be composed of $Fe_2O_3$ and $TiO_2$ at a weight ratio of 78:22.

Control 3

With 100 liters of water, 1.20 liters of an aqueous palladium sulfate solution (equivalent to 5 g of Pd per liter) and 8.00 liters of an aqueous sulfuric acid solution of titanyl sulfate added thereto were thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried gel was calcined under an atmosphere of air at 500° C. for 3 hours. The powder consequently obtained was found by the fluorescent X-ray method to be composed of $TiO_2$ and Pd at a weight ratio of 100:0.3. Subsequently, the powder obtained consequently was processed by the same method as described in Example 3 to obtain a molded product.

Control 4

With 100 liters of water, 1.20 liters of an aqueous platinum nitrate solution (equivalent to 5 g of Pt per liter) and 8.00 liters of an aqueous sulfuric acid solution of titanyl sulfate added thereto were thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried gel was calcined under an atmosphere of air at 400° C. for 5 hours. The powder consequently obtained was found by the fluorescent X-ray method to be composed of $TiO_2$ and Pt at a weight ratio of 100:0.3. Subsequently, the powder obtained consequently was processed by following the method of Example 3 while changing the calcination temperature to 380° C. to obtain a molded product.

Control 5

A powder was obtained by following the procedure of Example 11 while omitting the use of the aqueous manganese nitrate solution and was processed by following the procedure of Example 3 while changing the calcination temperature to 400° C. to obtain a molded product.

The resultant powder was found by the fluorescent Xray method to be composed of $Fe_2O_3$, $ZrO_2$, and Ru at a weight ratio of 78:22:1.0.

EXAMPLE 17

An autoclave of titanium having an inner volume of 1 liter was packed with 30 g of the catalyst produced in Example 1 and 250 g of waste water and further filled with air under a pressure of 25 kg/cm² G. The contents of the autoclave were heated to 250° C. and treated under a pressure of 82 kg/cm² G for three hours. The autoclave was cooled and the liquid was extracted from the autoclave. The waste water before the treatment and the treated liquid were tested for COD (Cr) concentration to find the efficiency of treatment. The waste water used for this treatment had been subjected to a wet oxidation treatment performed by way of pretreatment in the same manner as described above excepting the omission of the use of a catalyst. This waste water had a COD (Cr) concentration of 17 g/liter and a pH of 9.5. The results of the treatment were a COD (Cr) concentration of 0.7 g/liter, an efficiency of COD (Cr) treatment of 96%, and a pH of 8.2.

Control 6

The same waste water as used in Example 17 was treated by following the procedure of Example 17 while using 30 g of the powder produced in Control 1. The results of the treatment were a COD (Cr) concentration of 14 g/liter, an efficiency of COD (Cr) treatment of 18%, and a pH of 9.3.

EXAMPLE 18

In an plant for wet oxidation treatment illustrated in FIG. 1, a wet oxidation reaction column was packed with 1 liter of the catalyst produced in Example 3 and a treatment under the conditions of wet oxidation treatment was continued for 500hours. The treated liquid obtained at the end of the 500hours' treatment was tested for COD (Cr) concentration and pH and analyzed for triethanolamine by gas chromatography. The method of test and the results of the test will be described in detail below.

For the treatment under the conditions of wet oxidation by the use of a catalyst, a waste water forwarded through waste water feed line 7 was supplied by waste water feed pump 2 at a flow volume of 2 liters/hr under an increased pressure of 80 kg/cm² G. Meanwhile, the air forwarded through an oxygen-containing gas feed line 8 was given an increased pressure by a compressor 3. The compressed air was combined with the waste water mentioned above at an $O_2$/COD (Cr) (amount of oxygen in the air/amount of chemical oxygen demand) ratio of 2.0. The resultant gas-liquid mixture was forwarded through a gas-liquid mixture feed line 9, introduced upward into a wet oxidation reaction column 1 packed with the catalyst, and heated by an electric heater 4 so as to be subjected to a catalytic wet oxidation treatment at a temperature of 250° C. The treated liquid was forwarded through a treated liquid line 10 temporarily, passed through a condenser 5 to be cooled therein with the cooling water supplied from a line 11, and forwarded to a gas-liquid separator 6. The liquid hourly space velocity of the waste water through the catalyst bed was 2 $hr^{-1}$. In the gas-liquid separator 6, the liquid level therein was detected by a liquid level controller (LC) and was kept at a constant height with the aid of a liquid level controlling valve 12 and, at the same time, the pressure therein was detected by a pressure controller (PC) and an excess pressure, if any detected, was discharged via a gas discharge line 15 with the aid of a pressure control valve 14 so as to keep the inner pressure at a constant magnitude. The treated liquid was discharged through a treated liquid discharge line 13. The waste water subjected to the treatment had a COD (Cr) concentration of 37 g/liter, a pH value of 8.7, and a triethanol amine content of 5.0 g/liter. The treated liquid obtained at the end of 500hours' treatment had a COD (Cr) concentration of 1.2 g/liter, an efficiency of COD (Cr) treatment of 97%, and a pH value of 7.7. It was found to contain no detectable triethanolamine. Subsequently, the treatment of the waste water was stopped and the catalyst was removed from the wet oxidation reaction column. The catalyst showed no sign of any noticeable change due to the treatment.

EXAMPLE 19

The treatment performed in Example 18 was faithfully repeated, except that the catalyst obtained in Example 4 was used in the place of the catalyst used in Example 18. The treated liquid obtained at the end of 500hours' treatment had a COD (Cr) concentration of 1.8 g/liter, an efficiency of COD (Cr) treatment of 95%, and a pH value of 7.8. It was found to contain no detectable triethanol amine. Subsequently, the treatment of the waste water was stopped and the catalyst was removed from the wet oxidation reaction column. The catalyst showed no sign of any noticeable change due to the treatment.

EXAMPLE 20

The treatment performed in Example 18 was faithfully repeated, excepting the catalyst obtained in Example 10 was used in the place of the catalyst used in Example 18. The treated liquid obtained at the end of 500hours' treatment had a COD (Cr) concentration of 1.1 g/liter, an efficiency of COD (Cr) treatment of 97%, and a pH value of 7.7. It was found to contain no detectable triethanol amine. Subsequently, the treatment of the waste water was stopped and the catalyst was removed from the wet oxidation reaction column. The catalyst showed no sign of any noticeable change due to the treatment.

Control 7

The treatment performed in Example 18 was faithfully repeated, except that the molded product obtained in Control 2 was used in the place of the catalyst used in Example 18. The treated liquid obtained immediately after the start of the treatment had a COD (Cr) concentration of 19 g/liter, an efficiency of COD (Cr) treatment of 49%, and a pH value of 8.2 It was found to contain triethanolamine at a concentration of 1.9 g/liter.

Control 8

The treatment performed in Example 18 was faithfully repeated, except that the molded product obtained in Control 3 was used in the place of the catalyst used in Example 18. The treated liquid obtained immediately after the start of the treatment had a COD (Cr) concentration of 3.1 g/liter, an efficiency of COD (Cr) treatment of 92%, and a pH value of 7.8. It was found to contain no detectable triethanolamine. The treated liquid obtained at the end of 500 hours' treatment showed a COD (Cr) concentration of 8.3 g/liter, an efficiency of COD (Cr) treatment of 78%, and a pH value of 8.0. It was found by analysis to contain triethanolamine at a concentration of 0.3 g/liter.

Then, the treatment of the waste water was stopped and the molded product was extracted from the wet oxidation reaction column. When the extracted product was assayed by the fluorescent X-ray method for change of composition, it was found to have the palladium content thereof decreased owing to the treatment.

EXAMPLE 21

In an plant for wet oxidation treatment illustrated in FIG. 1, a wet oxidation reaction column was packed with 1 liter of the catalyst produced in Example 5 and a treatment under the conditions of wet oxidation treatment was continued for 500 hours. The treated liquid obtained at the end of the 500 hours' treatment was tested for COD (Cr) concentration and pH and analyzed by liquid chromatography for ethylenediamine tetraacetic acid. The waste water subjected to the treatment had a COD (Cr) concentration of 26 g/liter, a pH value of 12.8, and an ethylenediamine tetraacetic acid content of 2.1 g/liter. The conditions of the treatment of the waste water which was carried out by following the procedure of Example 18 were 270° C. of treating temperature, 90 $kg/cm^2$ G of treating pressure, 1.2 of 02/COD (Cr) (amount of oxygen in air/amount of chemical oxygen demand) ratio, and 1 $hr^{-1}$ of liquid hourly space velocity. The treated liquid obtained at the end of 500 hours' treatment had a COD (Cr) concentration of 0.32 g/liter, an efficiency of COD (Cr) treatment of 99%, and a pH value of 9.4. No ethylenediamine tetraacetic acid was detected. Subsequently, the treatment was stopped and the catalyst was removed from the wet oxidation reaction column. The extracted catalyst showed no sign of any noticeable change due to the treatment.

EXAMPLE 22

The treatment performed in Example 21 was faithfully repeated, except that the catalyst obtained in Example 7 was used in the place of the catalyst used in Example 21. The treated liquid obtained at the end of 500 hours' treatment had a COD (Cr) concentration of 0.37 g/liter, an efficiency of COD (Cr) treatment of 99%, and a pH value of 9.4. It was found to contain no detectable ethylenediamine tetraacetic acid. Subsequently, the treatment of the waste water was stopped and the catalyst was removed from the wet oxidation reaction column. The catalyst showed no sign of any noticeable change due to the treatment.

EXAMPLE 23

The treatment performed in Example 21 was faithfully repeated) except that the catalyst obtained in Example 8 was used in the place of the catalyst used in Example 21. The treated liquid obtained at the end of 500 hours' treatment had a COD (Cr) concentration of 0.21 g/liter, an efficiency of COD (Cr) treatment of 99%, and a pH value of 9.4. It was found to contain no detectable ethylenediamine tetraacetic acid. Subsequently, the treatment of the waste water was stopped and the catalyst was removed from the wet oxidation reaction column. The catalyst showed no sign of any noticeable change due to the treatment.

Control 9

The treatment performed in Example 21 was faithfully repeated, except that the molded product obtained in Control 2 was used in the place of the catalyst used in Example 21. The treated liquid obtained immediately after the start of the treatment had a COD (Cr) concentration of 16 g/liter, an efficiency of COD (Cr) treatment of 38%, and a pH value of 10.4. It was found to contain ethylenediamine tetraacetic acid at a concentration of 0.74 g/liter.

EXAMPLE 24

In an plant for wet oxidation treatment illustrated in FIG. 1, a wet oxidation reaction column was packed with 1 liter of the catalyst produced in Example 6 and a treatment under the conditions of wet oxidation treatment was continued for 500 hours. The treated liquid obtained at the end of the 500 hours' treatment was tested for COD (Cr) concentration and pH and analyzed by gas chromatography for dimethyl formamide. The waste water subjected to the treatment had a COD (Cr) concentration of 46 g/liter, a pH value of 10.2, and a dimethyl formamide content of 7.8 g/liter. The conditions of the treatment of the waste water which was carried out by following the procedure of Example 18 were 200° C. of treating temperature, 40 kg/cm$^2$ G of treating pressure, 1.2 of $O_2$/COD (Cr) (amount of oxygen in air/amount of chemical oxygen demand) ratio, and 1 hr$^{-1}$ of liquid hourly space velocity. The treated liquid obtained at the end of 500 hours' treatment had a COD (Cr) concentration of 3.7 g/liter, an efficiency of COD (Cr) treatment of 92%, and a pH value of 8.7. No dimethyl formamide was detected. Subsequently, the treatment was stopped and the catalyst was removed from the wet oxidation reaction column. The extracted catalyst showed no sign of any noticeable change due to the treatment.

EXAMPLE 25

The treatment performed in Example 24 was faithfully repeated, except that the catalyst obtained in Example 9 was used in the place of the catalyst used in Example 24. The treated liquid obtained at the end of 500 hourss' treatment had a COD (Cr) concentration of 4.2 g/liter, an efficiency of COD (Cr) treatment of 91%, and a pH value of 8.7. It was found to contain no detectable dimethyl formamide. Subsequently, the treatment of the waste water was stopped and the catalyst was removed from the wet oxidation reaction column. The catalyst showed no sign of any noticeable change due to the treatment.

Control 10

The treatment performed in Example 24 was faithfully repeated, except that the molded product obtained in Control 2 was used in the place of the catalyst used in Example 24. The treated liquid obtained immediately after the start of the treatment had a COD (Cr) concentration of 20 g/liter, an efficiency of COD (Cr) treatment of 57%, and a pH value of 9.3. It was found to contain dimethyl formamide at a concentration of 2.1 g/liter.

EXAMPLE 26

In an plant for wet oxidation treatment illustrated in FIG. 1, a wet oxidation reaction column was packed with 1 liter of the catalyst produced in Example 7 and a treatment under the conditions of wet oxidation treatment was continued for 100 hours. The treated liquid obtained at the end of the 100 hours' treatment was tested for COD (Cr) concentration and pH and analyzed by gas chromatography for p-chlorophenol.

The waste water subjected to the treatment had a COD (Cr) concentration of 24 g/liter, a pH value of 9.1, and a p-chlorophenol content of 0.9 g/liter. The conditions of the treatment of the waste water which was carried out by following the procedure of Example 18 were 250° C. of treating temperature, 75 kg/cm$^2$ G of treating pressure, 1.2 of $O_2$/COD (Cr) (amount of oxygen in air/amount of chemical oxygen demand) ratio, and 1 hr$^{-1}$ of liquid hourly space velocity. The treated liquid obtained at the end of 100 hours' treatment had a COD (Cr) concentration of 0.4 g/liter, an efficiency of COD (Cr) treatment of 98%, and a pH value of 8.4. No p-chlorophenol was detected. Subsequently, the treatment was stopped and the catalyst was removed from the wet oxidation reaction column. The extracted catalyst showed no sign of any noticeable change due to the treatment.

Control 11

The treatment performed in Example 26 was faithfully repeated, except that the molded product obtained in Control 2 was used in the place of the catalyst used in Example 26. The treated liquid obtained immediately after the start of the treatment had a COD (Cr) concentration of 7.5 g/liter, an efficiency of COD (Cr) treatment of 69%, and a pH value of 8.7. It was found to contain p-chlorophenol at a concentration of 0.35 g/liter.

EXAMPLE 27

In an plant for wet oxidation treatment illustrated in FIG. 1, a wet oxidation reaction column was packed with 1 liter of the catalyst produced in Example 3 and a treatment under the conditions of wet oxidation treatment was continued for 100 hours. The treated liquid obtained at the end of the 100 hours' treatment was tested for COD (Cr) concentration and pH and analyzed by gas chromatography for dimethyl sulfoxide (hereinafter referred to otherwise as "DMSO").

The waste water subjected to the treatment had a COD (Cr) concentration of 33 g/liter, a pH value of 13.1, and a DMSO content of 4.5 g/liter. The conditions of the treatment of the waste water which was carried out by following the procedure of Example 18 were 220° C. of treating temperature, 50 kg/cm$^2$ G of treating pressure, 2.0 of $O_2$/COD (Cr) (amount of oxygen in air/amount of chemical oxygen demand) ratio, and 1 hr$^{-1}$ of liquid hourly space velocity. The treated liquid obtained at the end of 100 hours' treatment had a COD (Cr) concentration of 1.0 g/liter, an efficiency of COD (Cr) treatment of 97%, and a pH value of 9.1. No DMSO was detected. Subsequently, the treatment was stopped and the catalyst was removed from the wet oxidation reaction column. The extracted catalyst showed no sign of any noticeable change due to the treatment.

Control 12

The treatment performed in Example 27 was faithfully repeated, except that the molded product obtained in Control 2 was used in the place of the catalyst used in Example 27. The treated liquid obtained immediately after the start of the treatment had a COD (Cr) concentration of 12 g/liter, an efficiency of COD (Cr) treatment of 64%, and a pH value of 8.6. It was found to contain DMSO at a concentration of 0.8 g/liter.

Control 13

The treatment performed in Example 27 was faithfully repeated, except that the molded product obtained in Control 4 was used in the place of the catalyst used in Example 27. The treated liquid obtained immediately after the start of the treatment had a COD (Cr) concentration of 2.3 g/liter, an efficiency of COD (Cr) treatment of 93%, and a pH value of 8.3. It was found to contain no detectable DMSO. The treated liquid obtained at the end of 100 hours' treatment had a COD (Cr) concentration of 6.3 g/liter, an efficiency of COD (Cr) treatment of 81%, and pH value of 8.5. It was found to contain DMSO at a concentration of 0.11 g/liter. Subsequently, the treatment of the waste water was stopped and the molded catalyst was extracted from the wet oxidation reaction column. When the extracted catalyst was assayed by the fluorescent X-ray method for change of composition, it was found to have the platinum content thereof slightly decreased particularly in the portion near the inlet part of the reaction column owing to the treatment. The portion of the molded catalyst near the inlet part was found to be composed of $TiO_2$ and Pt at a weight ratio of 100:0.16.

EXAMPLE 28

In an plant for wet oxidation treatment illustrated in FIG. 1, a wet oxidation reaction column was packed with 1 liter of the catalyst produced in Example 5 and a treatment under the conditions of wet oxidation treatment was continued for 500 hours. The treated liquid obtained at the end of the 500 hours' treatment was tested for COD (Cr) concentration and pH and analyzed by use of a detecting tube for sulfide ion and by anion chromatography for thiosulfuric acid ion. The waste water subjected to the treatment had a COD (Cr) concentration of 10.5 g/liter, a pH value of 13.3, and a thiosulfuric acid ion content of 0.30 g/liter. The conditions of the treatment of the waste water which was carried out by following the procedure of Example 18 were 160° C. of treating temperature, 9 $kg/cm^2$ G of treating pressure, 2.5 of $O_2$/COD (Cr) (amount of oxygen in air/amount of chemical oxygen demand) ratio, and 1 $hr^{-1}$ of liquid hourly space velocity. The treated liquid obtained at the end of 100 hours' treatment had a COD (Cr) concentration of 2.8 g/liter, an efficiency of COD (Cr) treatment of 73%, and a pH value of 8.2. Neither sulfide ion nor thiosulfuric acid ion was detected. Subsequently, the treatment was stopped and the catalyst was removed from the wet oxidation reaction column. The extracted catalyst showed no sign of any noticeable change due to the treatment.

Control 14

The treatment performed in Example 28 was faithfully repeated, except that the molded product obtained in Control 2 was used in the place of the catalyst used in Example 28. The treated liquid obtained immediately after the start of the treatment had a COD (Cr) concentration of 3.9 g/liter, an efficiency of COD (Cr) treatment of 63%, and a pH value of 8.7. It did not contain any detectable sulfide ion but detected thiosulfuric acid ion at a concentration of 0.35 g/liter.

EXAMPLE 29

In an plant for wet oxidation treatment illustrated in FIG. 1, a wet oxidation reaction column was packed with 1 liter of the catalyst produced in Example 11 and a treatment under the conditions of wet oxidation treatment was continued for 100 hours. The treated liquid obtained at the end of the 100 hours' treatment was tested for COD (Cr) concentration and pH and analyzed by gas chromatography for aniline. The waste water subjected to the treatment had a COD (Cr) concentration of 28 g/liter, a pH value of 12.9, and an aniline content of 1.80 g/liter. The conditions of the treatment of the waste water which was carried out by following the procedure of Example 18 were 250° C. of treating temperature, 75 $kg/cm^2$ G of treating pressure, 1.2 of $O_2$/COD (Cr) (amount of oxygen in air/amount of chemical oxygen demand) ratio, and 1 $hr^{-1}$ of liquid hourly space velocity. The treated liquid obtained at the end of 100 hours' treatment had a COD (Cr) concentration of 0.17 g/liter, an efficiency of COD (Cr) treatment of 99%, and a pH value of 8.6. No aniline was detected. Subsequently, the treatment of the waste water was stopped and the catalyst was removed from the wet oxidation reaction column. The extracted catalyst showed no sign of any noticeable change due to the treatment.

EXAMPLE 30

The treatment performed in Example 29 was faithfully repeated, except that the catalyst obtained in Example 13 was used in the place of the catalyst used in Example 29. The treated liquid obtained at the end of 100 hours' treatment had a COD (Cr) concentration of 1.4 g/liter, an efficiency of COD (Cr) treatment of 95%, and a pH value of 8.8. It was found to contain no detectable aniline. Subsequently, the treatment of the waste water was stopped and the catalyst was removed from the wet oxidation reaction column. The catalyst showed no sign of any noticeable change due to the treatment.

Control 15

The treatment performed in Example 29 was faithfully repeated, except that the molded product obtained in Control 2 was used in the place of the catalyst used in Example 29. The treated liquid obtained immediately after the start of the treatment had a COD (Cr) concentration of 13.5 g/liter, an efficiency of COD (Cr) treatment of 52%, and a pH value of 10.7. It was found to contain aniline at a concentration of 0.5 g/liter.

Control 16

The treatment performed in Example 29 was faithfully repeated, except that the molded product obtained in Control 5 was used in the place of the catalyst used in Example 29. The treated liquid obtained immediately after the start of the treatment had a COD (Cr) concentration of 2.5 g/liter, an efficiency of COD (Cr) treatment of 91%, and a pH value of 8.9. It was found to contain no detectable aniline. The treated liquid obtained at the end of 100 hours' treatment had a COD (Cr) concentration of 4.8 g/liter, an efficiency of COD (Cr) treatment of 83%, and a pH value of 9.4. It was found by analysis to contain aniline at a concentration of 0.15 g/liter.

EXAMPLE 31

The treatment performed in Example 17 was faithfully repeated, except that the catalyst obtained in Example 14 was used in the place of the catalyst used in Example 17. The treated liquid had a COD (Cr) concentration of 0.4 g/liter, an efficiency of COD (Cr) treatment of 98%, and a pH value of 7.6. It was found to contain no detectable aniline. Subsequently, the catalyst was extracted was removed from the reaction column. The catalyst showed no sign of any noticeable change due to the treatment.

Control 16A

The treatment performed in Example 18 was faithfully repeated, except that the catalyst obtained in Example 15 was used in the place of the catalyst used in Example 18. The treated liquid obtained immediately after the start of the treatment had a COD (Cr) concentration of 2.2 g/liter, an efficiency of COD (Cr) treatment of 93%, and a pH value of 7.8. It was found to contain no detectable triethanolamine. The treated liquid obtained at the end of 250 hours' treatment had a COD (Cr) concentration of 4.0 g/liter, an efficiency of COD (Cr) treatment of 89%, and a pH value of 7.9. It was found to contain no detectable triethanolamine.

Control 16B

The treatment performed in Example 24 was faithfully repeated, except that the catalyst obtained in Example 16 was used in the place of the catalyst used in Example 24. The treated liquid obtained immediately after the start of the treatment had a COD (Cr) concentration of 6.0 g/liter, an efficiency of COD (Cr) treatment of 87%, and a pH value of 8.9. It was found to contain no detectable dimethyl formamide. The treated liquid obtained at the end of 250 hours' treatment had a COD (Cr) concentration of 8.3 g/liter, an efficiency of COD (Cr) treatment of 82%, and a pH value of 9.2. It was found to contain no detectable dimethyl formamide.

EXAMPLE 34

In 50 liters of water, 1.63 kg of zirconium oxynitrate [$ZrO(NO_3)_2 \cdot 2H_2O$] was dissolved. The resultant solution and 1.00 liter of an aqueous manganese nitrate [$Mn(NO_3)_2$] solution (equivalent to 250 g of $MnO_2$ per liter) were combined. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder catalyst was found by the fluorescent X-ray method to be composed of $MnO_2$ and $ZrO_2$ at a weight ratio of 25:75. By the BET method, it was found to have a specific surface area of 68 m2/g. When it was analyzed by the X-ray diffraction for crystal structure of the oxide of manganese, the diffraction pattern showed no grating of the oxide of manganese.

EXAMPLE 35

An oxide and/or a composite oxide of manganese, iron, and titanium was prepared by the following method. As a titanium source, an aqueous sulfuric acid solution having the following composition was used.

| | |
|---|---|
| $TiOSO_4$ | 250 g/liter (as $TiO_2$) |
| Total $H_2SO_4$ | 1,100 g/liter |

To 50 liters of water, 0.80 liter of aqueous manganese chloride [$MnCl_2$] solution (equivalent to 250 g of $MnO_2$ per liter) was added. They were kept stirred at a temperature of 30° C. and aqua ammonia was gradually added thereto dropwise until pH 8. The neutralized mixture was left standing for 15 hours to induce precipitation (gel). The aqueous solution of this gel was kept stirred again at a temperature of 30° C. and 3.20 liters of the aqueous sulfuric acid solution of titanyl sulfate of the composition mentioned above was added thereto and aqua ammonia was further added gradually thereto dropwise until pH 8. The produced mixture was left standing for 15 hours to induce precipitation (gel). This gel was separated by filtration, washed with water, and dried at 120° C. for 10 hours. Then, the dried product was calcined under an atmosphere of air at 430° C. for 4 hours. The resultant powder was found by the fluorescent X-ray method to be composed of $MnO_2$ and $TiO_2$ at a weight ratio of 20:80. By the BET method, it was found to have a specific surface area of 101 m²/g. When it was analyzed by the X-ray diffraction for crystal structure of the oxide of manganese, the diffraction pattern showed no grating of the oxide of manganese. Subsequently, the powder thus obtained was processed by following the procedure of Example 3 while changing the firing temperature to 350° C. to form a catalyst. The catalyst thus obtained was found by the BET method to have a specific surface area of 101 m²/g.

EXAMPLE 36

With 50 liters of water, 3.88 kg liters of aqueous sulfuric acid solution of titanyl nitrate was thoroughly mixed. The resultant solution was kept stirred at a temperature of 30° C. and aqua ammonia was gradually added thereto dropwise until pH 8. The neutralized mixture was left standing for 15 hours to induce precipitation (gel). This gel was separated by filtration, washed with water, combined with 0.030 kg of electrolytic manganese dioxide powder, kneaded thoroughly by the use of a kneader, and dried at 120° C. for 10 hours. Then, the dried product was calcined under an atmosphere of air at 420° C. for 5 hours. The powder consequently obtained was found by the fluorescent X-ray method to be composed of $MnO_2$ and $TiO_2$ at a weight ratio of 3:97. Subsequently, the powder was processed by following the procedure of Example 3 while changing the calcination temperature to 400° C. to form a catalyst. By the BET method, this catalyst was found to have a specific surface area of 105 m²/g. When it was analyzed by the X-ray diffraction for oxide of manganese, the diffraction pattern showed a peak conforming to $\beta$-$MnO_2$. The intensity of this peak in the diffraction pattern was very small as compared with that of the diffraction peak of the $\beta$-$MnO_2$ which was obtained by simply mixing thoroughly a product produced by calcining 0.030 kg of the aforementioned electrolytic manganese dioxide powder at 420° C. for 5 hours with 0.970 kg of a powder of titania produced by the same method as will be described hereinafter in Example 38 and analyzed similarly by the X-ray diffraction method. The intensity ratio was about 1/4.

EXAMPLE 37

In 50 liters of water, 1.95 kg of zirconium oxynitrate [$ZrO(NO_3)_2 \cdot 2H_2O$] was dissolved. The produced solution was kept stirred at a temperature of 30° C. and aqua ammonia was gradually added thereto dropwise until pH 8. The neutralized mixture was left standing for 15 hours to induce precipitation (gel). The gel consequently formed was separated by filtration, washed with water, and further combined with 0.40 liter of an aqueous manganese nitrate [$Mn(NO_3)_2$] solution (equivalent to 250 g of $MnO_2$ per liter) and thoroughly kneaded. The resultant blend was dried at 120° C. for 10 hours and calcined under an atmosphere of air at 450° C. for 3 hours. The resultant powder was found by the fluorescent X-ray method to be composed of $MnO_2$ and $ZrO_2$ at a weight ratio of 10:90. By the BET method, it was found to have a specific surface area of 72 m$^2$/g. When it was analyzed by the X-ray diffraction for crystal structure of the oxide of manganese, the diffraction pattern showed no grating of the oxide of manganese. Subsequently, the powder thus obtained was processed by following the procedure of Example 3 while changing the firing temperature to 430° C. to form a catalyst.

EXAMPLE 38

One hundred (100 liters of water and 8.00 liters of the aqueous sulfuric acid solution of titanyl sulfate mentioned above were kept stirred at a temperature of 30° C. and aqua ammonia was gradually added thereto dropwise until pH 8. The produced neutralized mixture was left standing for 15 hours to induce precipitation (gel). The gel was separated by filtration, washed with water, and dried at 120° C. for 10 hours. Then, the dried product was calcined under an atmosphere of air at 700° C. for five hours to obtain titania powder.

In a kneader, 950 g of the titania powder obtained as described above, 66 g of manganese carbonate [MnCO$_3$], and water were combined and thoroughly kneaded. The resultant blend was dried at 120° C. for 10 hours and then calcined under an atmosphere of air at 350° C. for 4 hours. The produced powder was found by the fluorescent X-ray method to be composed of MnO$_2$ and TiO$_2$ at a weight ratio of 5:95. By the BET method, it was found to have a specific surface area of 35 m$^2$/g. When it was analyzed by the X-ray diffraction for oxide of manganese, the diffraction pattern showed no grating of the oxide of manganese. Subsequently, the powder thus obtained was processed by following the procedure of Example 3 while changing the calcination temperature to 330° C. to form a catalyst.

EXAMPLE 39

The amount 970 g of a titania powder produced by the same method as described in Example 38 and 0.30 liter of an aqueous manganese nitrate [Mn(NO$_3$)$_2$] solution (equivalent to 100 g of MnO$_2$ per liter) were combined and thoroughly kneaded. The produced blend was dried at 120° C. for 10 hours and then calcined under an atmosphere of air at 430° C. for 4 hours. The resultant powder was found by the fluorescent X-ray method to be composed of MnO$_2$ and TiO$_2$ at a weight ratio of 3:97. By the BET method, it was found to have a specific surface area of 34 m$^2$/g. When it was analyzed by the X-ray diffraction for oxide of manganese, the diffraction pattern showed no grating of the oxide of manganese. Subsequently, the powder thus obtained was processed by following the procedure of Example 3 while changing the fcalcination temperature to 400° C. to form a catalyst.

EXAMPLE 40

From a titania powder produced by the same method as described in Example 38, titania pellets were molded by following the procedure of Example 3 while changing the calcination temperature to 600° C. The amount 990 g of the titania pellets thus obtained were impregnated with 0.20 liter of an aqueous manganese nitrate [Mn(NO$_3$)$_2$] solution (equivalent to 50 g of MnO$_2$ per liter). The wet titania pellets were dried at 120° C. for 10 hours and then calcined under an atmosphere of air at 300° C. for 5 hours. The catalyst consequently obtained was found by the fluorescent X-ray method to be composed of MnO$_2$ and TiO$_2$ at a weight ratio of 1:99. By the BET method, it was found to have a specific surface area of 30 m$^2$/g. When it was analyzed by the X-ray diffraction for oxide of manganese, the diffraction pattern showed no grating of the oxide of manganese.

EXAMPLE 41

In 100 liters of water, 3.26 kg of zirconium oxynitrate [ZrO(NO$_3$)$_2$·2H$_2$O] was dissolved. The resultant solution was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 700° C. for five hours to obtain zirconia powder.

In a kneader, 0.5 kg of the zirconia powder and 0.50 kg of the powder obtained in Example 35 and composed of MnO$_2$ and TiO$_2$ at a weight ratio of 20:80 were combined and thoroughly kneaded and then molded by following the procedure of Example 3 while changing the calcination temperature to 350° C. The catalyst consequently obtained was found by the fluorescent X-ray method to be composed of MnO$_2$, TiO$_2$, and ZrO$_2$ at a weight ratio of 10:40:50. By the BET method, it was found to have a specific surface area of 70 m$^2$/g.

EXAMPLE 42

In 50 liters of water, 0.40 liter of an aqueous manganese nitrate [Mn(NO$_3$)$_2$] solution (equivalent to 250 g of MnO$_2$ per liter), 0.60 liter of an aqueous palladium nitrate solution (equivalent to 5 g of Pd per liter), and 3.60 liters of the aqueous sulfuric acid solution of titanyl sulfate described above were thoroughly mixed. The resultant mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 400° C. for 5 hours. The resultant powder was found by the fluorescent X-ray method to be composed of MnO$_2$, TiO$_2$, and Pd at a weight ratio of 10:90:0.3. By the BET method, it was found to have a specific surface area of 110 m$^2$/g. When it was analyzed by the X-ray diffraction for crystal structure of the oxide of manganese, the diffraction pattern showed no grating of the oxide of manganese. Subsequently, the produced powder was processed by following the procedure of Example 3 while changing the calcination temperature to 380° C. to form a catalyst.

EXAMPLE 43

In 50 liters of water, 0.40 liter of an aqueous manganese nitrate [Mn(NO$_3$)$_2$] solution (equivalent to 250 g of MnO$_2$ per liter), 1.20 liters of an aqueous ruthenium nitrate solution (equivalent to 5 g of Ru per liter), and 3.60 liters of the aqueous sulfuric acid solution of titanyl sulfate described above were thoroughly mixed. The resultant mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of MnO$_2$, TiO$_2$, and Ru at a weight ratio of 10:90:0.6. By the BET method, it was found to have a specific surface area of 100 m$^2$/g.

When it was analyzed by the X-ray diffraction for crystal structure of the oxide of manganese, the diffraction pattern showed no grating of the oxide of manganese. Subsequently, the produced powder was processed by following the procedure of Example 3 while changing the calcination temperature to 400° C. to form a catalyst.

EXAMPLE 44

In 50 liters of water, 1.55 kg of zirconium oxynitrate [$ZrO(NO_3)_2 \cdot 2H_2O$] was dissolved. With the resultant solution, 0.15 liter of an aqueous manganese nitrate [$Mn(NO3)2$] solution (equivalent to 250 g of $MnO_2$ per liter) and 0.50 liter of an aqueous platinum nitrate solution (equivalent to 3 g of Pt per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 350° C. for 4 hours. The resultant powder was found by the fluorescent X-ray method to be composed of $MnO_2$, $ZrO_2$, and Pt at a weight ratio of 5:95:0.2. By the BET method, it was found to have a specific surface area of 93 $m^2/g$. When it was analyzed by the X-ray diffraction for crystal structure of the oxide of manganese, the diffraction pattern showed no grating of the oxide of manganese. Subsequently, the produced powder was processed by following the procedure of Example 3 while changing the calcination temperature to 330° C. to form a catalyst.

EXAMPLE 45

In 50 liters of water, 0.40 liter of an aqueous manganese nitrate [$Mn(NO_3)_2$] solution (equivalent to 250 g of $MnO_2$ per liter), 2.50 liters of an aqueous rhodium nitrate solution (equivalent to 2 g of Rh per liter), and 3.60 liters of the aqueous sulfuric acid solution of titanyl sulfate mentioned above were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of $MnO_2$, $TiO_2$, and Rh at a weight ratio of 10:90:0.5. By the BET method, it was found to have a specific surface area of 109 $m^2/g$. When it was analyzed by the X-ray diffraction for crystal structure of the oxide of manganese, the diffraction pattern showed no grating of the oxide of manganese. Subsequently, the produced powder was processed by following the procedure of Example 3 while changing the calcination temperature to 400° C. to form a catalyst.

EXAMPLE 46

In 50 liters of water, 0.40 liter of an aqueous manganese nitrate [$Mn(NO_3)_2$] solution (equivalent to 250 g of $MnO_2$ per liter), 2.50 liters of an aqueous iridium chloride solution (equivalent to 2 g of Ir per liter), and 3.60 liters of the aqueous sulfuric acid solution of titanyl sulfate mentioned above were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of $MnO_2$, $TiO_2$, and Ir at a weight ratio of 10:90:0.9. By the BET method, it was found to have a specific surface area of 105 $m^2/g$. When it was analyzed by the X-ray diffraction for crystal structure of the oxide of manganese, the diffraction pattern showed no grating of the oxide of manganese. Subsequently, the produced powder was processed by following the procedure of Example 3 while changing the calcination temperature to 400° C. to form a catalyst.

Control 16C

A gel obtained by the same method as described in Example 35 was separated by filtration, washed with water, and dried at 120° C. for 10 hours. The dried product was further calcined under an atmosphere of air at 600° C. for 3 hours. The powder obtained consequently was found by the fluorescent X-ray method to be composed of $Mn_2O_3$ and $TiO_2$ at a weight ratio of 18.5:81.5. By the BET method, it was found to have a specific surface area of 60 $m^2/g$. When it was analyzed by the X-ray diffraction for crystal structure of the oxide of manganese, the diffraction pattern showed no grating of the oxide of manganese. Subsequently, the produced powder was processed by following the procedure of Example 3 while changing the calining temperature to 350° C. to form a catalyst.

Control 16D

A powder obtained by following the procedure of Example 36 while changing the calcination temperature to 600° C. was formed by the same method as described in Example 36 while changing the calcination temperature to 400° C. The powder consequently obtained was found by the fluorescent X-ray method to be composed of $Mn_2O_3$ and $TiO_2$ at a weight ratio of 2.7:97.3. By the BET method, the produced catalyst was found to have a specific surface area of 52 $m^2/g$. When it was analyzed by the X-ray diffraction for oxide of manganese, the diffraction pattern showed a peak conforming to $\alpha$-$MnO_2$. The intensity of this peak in the diffraction pattern was very small as compared with that of the diffraction peak of the $\alpha$-$MnO_2$ which was obtained by simply mixing thoroughly 0.027 kg of a powder of reagent $\alpha$-$Mn_2O_3$ with 0.970 kg of a powder of titania produced by the same method as described in Example 38 and analyzed similarly by the X-ray diffraction method. The intensity ratio was about 1/5.

Control 17

A powder of zirconia was produced by following the procedure of Example 34 while omitting the use of the aqueous manganese nitrate solution.

Control 18

A molded product of titania was obtained by following the procedure of Example 40 while omitting the step of impregnation with an aqueous manganese nitrate solution.

Control 19

In 50 liters of water, 0.60 liter of an aqueous palladium nitrate solution (equivalent to 5 g of Pd per liter) and 4.00 liters of an aqueous sulfuric acid solution of titanyl sulfate were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 480° C. for 3 hours. The resultant powder was found by the fluorescent X-ray method to be composed of $TiO_2$ and Pd at a weight ratio of 100:0.30. Subsequently, the produced powder was processed by following the procedure of Example 3 while changing the calcination temperature to 400° C. to form a molded product.

Control 20

In 50 liters of water, 1.20 liter of an aqueous ruthenium nitrate solution (equivalent to 5 g of Ru per liter) and 4.00 liters of an aqueous sulfuric acid solution of titanyl sulfate were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 400° C. for 5 hours. The resultant powder was found by the fluorescent X-ray method to be composed of TiO2 and Ru at a weight ratio of 100:0.60. Subsequently, the produced powder was processed by following the procedure of Example 3 while changing the calcination temperature to 380° C. to form a molded product.

Control 21

In 50 liters of water, 1.63 kg of zirconium oxynitrate $[ZrO(NO_3)_2 \cdot 2H_2O]$ was dissolved. The produced solution and 0.50 liter of an aqueous platinum nitrate solution (equivalent to 3 g of Pt per liter) added thereto were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of $ZrO_2$ and Pt at a weight ratio of 100:0.20. Subsequently, the produced powder was processed by following the procedure of Example 3 while changing the calcination temperature to 400° C. to form a molded product.

Control 22

With 50 liters of water, 2.50 liters of an aqueous rhodium nitrate solution (equivalent to 2 g of Rh per liter) and 4.00 liters of an aqueous sulfuric acid solution of titanyl sulfate were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of $TiO_2$ and Rh at a weight ratio of 100:0.50. Subsequently, the produced powder was processed by following the procedure of Example 3 while changing the calcination temperature to 400° C. to form a molded product.

Control 23

With 50 liters of water, 2.50 liters of an aqueous iridium chloride solution (equivalent to 2 g of Ir per liter) and 4.00 liters of an aqueous sulfuric acid solution of titanyl sulfate were thoroughly mixed. The produced mixture was kept stirred at a temperature of 30° C. and aqua ammonia was gradually added thereto dropwise until pH 8. The neutralized mixture was left standing for 15 hours to induce precipitation (gel). This gel was separated by filtration, washed with water, and dried at 120° C. for 10 hours. Then, the dried product was calcined under an atmosphere of air at 450° C. for 3 hours. The resultant powder was found by the fluorescent X-ray method to be composed of $TiO_2$ and Ir at a weight ratio of 100:0.50. Subsequently, the produced powder was processed by following the procedure of Example 3 while changing the calcination temperature to 400° C. to form a molded product.

EXAMPLE 49

An autoclave of titanium having an inner volume of 1 liter was packed with 30 g of the catalyst produced in Example 34 and 250 g of waste water and further filled with air under a pressure of 25 kg/cm² G. The contents of the autoclave were heated to 250° C. and treated under a pressure of 82 kg/cm² G for three hours. The autoclave was cooled and the liquid was extracted from the autoclave. The waste water before the treatment and the treated liquid were tested for COD (Cr) concentration and pH and analyzed by liquid chromatography for ethylene diamine. The waste water used for this treatment had a COD (Cr) concentration of 25 g/liter, a pH of 9.3, and an ethylene diamine content of 0.5 g/liter. The results of the treatment were a COD (Cr) concentration of 0.9 g/liter, an efficiency of COD (Cr) treatment of 96%, and a pH of 8.3. The treated liquid was found to contain no detectable ethylene diamine.

Control 24

The same waste water as used in Example 49 was treated with 30 g of the zirconia powder produced in Control 17 by following the procedure of Example 49. The results of the treatment were a COD (Cr) concentration of 14 g/liter, an efficient of COD (Cr) treatment of 44%, and a pH of 8.8. The treated liquid was found to contain ethylene diamine at a concentration of 0.12 g/liter.

EXAMPLE 50

In an plant for wet oxidation treatment illustrated in FIG. 1, a wet oxidation reaction column was packed with 1 liter of the catalyst produced in Example 35 and a treatment under the conditions of wet oxidation treatment was continued for 500 hours. The treated liquid obtained at the end of the 500 hours' treatment was tested for COD (Cr) concentration and pH and analyzed for aniline by gas chromatography. The method of test was identical with that of Example 18, except that the temperature of treatment was changed to 260° C. The results of the test will be described in detail below.

The waste water subjected to the treatment had a COD (Cr) concentration of 42 g/liter, a pH value of 10.2, and an aniline content of 3.0 g/liter. The treated liquid obtained at the end of 500 hours' treatment had a COD (Cr) concentration of 1.4 g/liter, an efficiency of COD (Cr) treatment of 97%, and a pH value of 8.5. It was found to contain no detectable aniline. Subsequently, the treatment of the waste water was stopped and the catalyst was removed from the wet oxidation reaction column. The catalyst showed no sign of any noticeable change due to the treatment.

EXAMPLE 51

The procedure of Example 50 was repeated, except that the catalyst obtained in Example 37 was used in the place of the catalyst used in Example 50. The treated liquid obtained at the end of 500 hours' treatment had a COD (Cr) concentration of 2.4 g/liter, an efficiency of COD (Cr) treatment of 94%, and a pH value of 8.6. It was found to contain no detectable aniline. Subsequently, the treatment of the waste water was stopped and the catalyst was removed from the wet oxidation reaction column. The catalyst showed no sign of any noticeable change due to the treatment.

EXAMPLE 52

The procedure of Example 50 was repeated, except that the catalyst obtained in Example 42 was used in the place of the catalyst used in Example 50 and the waste water incorporated therein sodium hydroxide at a ratio of 1.6 g per liter of the waste water. The treated liquid obtained at the end of 500 hours' treatment had a COD (Cr) concentration of 1.7 g/liter, an efficiency of COD (Cr) treatment of 96%, and a pH value of 8.8. It was found to contain no detectable aniline. Subsequently, the treatment of the waste water was stopped -and the catalyst was removed from the wet oxidation reaction column. The catalyst showed no sign of any noticeable change due to the treatment.

EXAMPLE 53

The procedure of Example 50 was repeated, except that the catalyst obtained in Example 43 was used in the place of the catalyst used in Example 50 and the waste water incorporated therein sodium hydroxide at a ratio of 1.6 g per liter of the waste water. The treated liquid obtained at the end of 500 hours' treatment had a COD (Cr) concentration of 1.8 g/liter, an efficiency of COD (Cr) treatment of 96%, and a pH value of 8.8. It was found to contain no detectable aniline. Subsequently, the treatment of the waste water was stopped and the catalyst was removed from the wet oxidation reaction column. The catalyst showed no sign of any noticeable change due to the treatment.

Control 24A

The procedure of Example 50 was repeated, except that the catalyst obtained in Example 47 was used in the place of the catalyst used in Example 50. The treated liquid obtained immediately after the start of the treatment had a COD (Cr) concentration of 3.9 g/liter, an efficiency of COD (Cr) treatment of 91%, and a pH value of 8.7. It was found to contain no detectable aniline.

The treated liquid obtained at the end of 500 hours' treatment had a COD (Cr) concentration of 5.5 g/liter, an efficiency of COD (Cr) treatment of 87%, and a pH of 8.8. It was found to contain no detectable aniline.

Control 25

The procedure of Example 50 was repeated, excepting that the molded product obtained in control 18 was used in the place of the catalyst used in Example 50. The treated liquid obtained immediately after the start of the treatment had a COD (Cr) concentration of 26 g/liter, an efficiency of COD (Cr) treatment of 38%, and a pH value of 9.2 It was found to contain aniline at a concentration of 1.1 g/liter. The efficiency of treatment was 63%.

Control 26

The procedure of Example 50 was repeated, except that the molded product obtained in Control 19 was used in the place of the catalyst used in Example 50. The treated liquid obtained immediately after the start of the treatment had a COD (Cr) concentration of 4.5 g/liter, an efficiency of COD (Cr) treatment of 89%, and a pH value of 8.8. It was found to contain no detectable aniline.

The treated liquid obtained at the end of 500 hours' treatment had a COD (Cr) concentration of 17.6 g/liter, an efficiency of COD (Cr) treatment of 58%, and a pH of 9.1. It was found to contain aniline at a concentration of 0.9 g/liter. The treatment of the waste water was subsequently stopped and the molded product was extracted from the wet oxidation reaction column. When the extracted molded product was analyzed by the fluorescent X-ray method for change of composition, it was found to have the palladium content thereof decreased particularly in the portion thereof near the input part of the reaction column. The portion of the molded product near the input part was found to be composed of $TiO_2$ and Pd at a weight ratio of 100:0.11.

Control 27

The procedure of Example 50 was repeated, except that the molded product obtained in Control 20 was used in the place of the catalyst used in Example 50. The treated liquid obtained immediately after the start of the treatment had a COD (Cr) concentration of 5.0 g/liter, an efficiency of COD (Cr) treatment of 88%, and a pH value of 8.8. It was found to contain no detectable aniline.

The treated liquid obtained at the end of 500 hours' treatment had a COD (Cr) concentration of 9.8 g/liter, an efficiency of COD (Cr) treatment of 77%, and a pH of 9.0. It was found to contain aniline at a concentration of 0.2 g/liter. The treatment of the waste water was subsequently stopped and the molded product was extracted from the wet oxidation reaction column. When the extracted molded product was analyzed by the fluorescent X-ray method for change of composition, it was found to have the ruthenium content thereof decreased particularly in the portion thereof near the input part of the reaction column. The portion of the molded product near the input part was found to be composed of $TiO_2$ and Ru at a weight ratio of 100:0.35.

EXAMPLE 55

In a plant for wet oxidation treatment illustrated in FIG. 1, a wet oxidation reaction column was packed with 1 liter of the catalyst produced in Example 36 and a treatment under the conditions of wet oxidation treatment was continued for 500 hours. The treated liquid obtained at the end of the 500 hours' treatment was tested for COD (Cr) concentration and pH and analyzed for glutamic acid by liquid chromatography. The waste water subjected to the treatment had a COD (Cr) concentration of 31 g/liter, a pH value of 13.1, and a glutamic acid content of 3.6 g/liter. The conditions of the treatment of the waste water which was carried out by following the procedure of Example 18 were 265° C. of treating temperature, 90 kg/cm$^2$ G of treating pressure, 1.1 of $O_2$/COD (Cr) (amount of oxygen in air/amount of chemical oxygen demand) ratio, and 1 hr$^{-1}$ of liquid hourly space velocity.

The treated liquid obtained at the end of 500 hours' treatment had a COD (Cr) concentration of 0.35 g/liter, an efficiency of COD (Cr) treatment of 99%, and a pH value of 8.7. It was found to contain no detectable glutamic acid. The treatment of the waste water was subsequently stopped and the catalyst was removed from the wet oxidation reaction column. The catalyst showed no sign of any noticeable change due to the treatment.

EXAMPLE 56

The procedure of Example 55 was repeated, except that the catalyst obtained in Example 38 was used in the place of the catalyst used in Example 55.

The treated liquid obtained at the end of 500 hours' treatment had a COD (Cr) concentration of 0.31 g/liter, an efficiency of COD (Cr) treatment of 99%, and a pH of 8.6. It was found to contain no detectable glutamic acid. Subsequently, the treatment of the waste water was stopped and the catalyst was removed from the wet oxidation reaction column. - The catalyst showed no sign of any noticeable change due to the treatment.

Control 27A

The procedure of Example 55 was repeated, except that the catalyst obtained in Example 48 was used in the place of the catalyst used in Example 55. The treated liquid obtained immediately after the start of the treatment had a COD (Cr) concentration of 1.2 g/liter, an efficiency of COD (Cr) treatment of 96%, and a pH value of 8.9. It was found to contain no detectable glutamic acid.

The treated liquid obtained at the end of 500 hours' treatment had a COD (Cr) concentration of 4.2 g/liter, an efficiency of COD (Cr) treatment of 86%, and a pH of 9.1. It was found to contain no detectable glutamic acid.

Control 28

The procedure of Example 55 was repeated, except that the molded product obtained in Control 18 was used in the place of the catalyst used in Example 55. The treated liquid obtained immediately after the start of the treatment had a COD (Cr) concentration of 18 g/liter, an efficiency of COD (Cr) treatment of 42%, and a pH value of 9.7. It was found to contain glutamic acid at a concentration of 0.47 g/liter.

EXAMPLE 58

In a plant for wet oxidation treatment illustrated in FIG. 1, a wet oxidation reaction column was packed with 1 liter of the catalyst produced in Example 41 and a treatment under the conditions of wet oxidation treatment was continued for 500 hours. The treated liquid obtained at the end of the 500 hours' treatment was tested for COD (Cr) concentration and pH and analyzed for p-chlorophenol by gas chromatography. The waste water subjected to the treatment had a COD (Cr) concentration of 16 g/liter, a pH value of 8.3, and a p-chlorophenol content of 1.4 g/liter. The conditions of the treatment of the waste water which was carried out by following the procedure of Example 18 were 240° C. of treating temperature, 65 kg/cm$^2$ G of treating pressure, 1.0 of O$_2$/COD (Cr) (amount of oxygen in air/ amount of chemical oxygen demand) ratio, and 1 hr$^{-1}$ of liquid hourly space velocity.

The treated liquid obtained at the end of 500 hours' treatment had a COD (Cr) concentration of 0.49 g/liter, an efficiency of COD (Cr) treatment of 97%, and a pH value of 7.3. It was found to contain no detectable p-chlorophenol. The treatment of the waste water was subsequently stopped and the catalyst was removed from the wet oxidation reaction column. The catalyst showed no sign of any noticeable change due to the treatment.

Control 29

The procedure of Example 58 was repeated, except that the molded product obtained in Control 18 was used in the place of the catalyst used in Example 58. The treated liquid obtained immediately after the start of the treatment had a COD (Cr) concentration of 5.3 g/liter, an efficiency of COD (Cr) treatment of 67%, and a pH value of 7.5. It was found to contain p-chlorophenol at a concentration of 0.6 g/liter.

EXAMPLE 59

In a plant for wet oxidation treatment illustrated in FIG. 1, a wet oxidation reaction column was packed with 1 liter of the catalyst produced in Example 39 and a treatment under the conditions of wet oxidation treatment was continued for 500 hours. The treated liquid obtained at the end of the 500 hours' treatment was tested for COD (Cr) concentration and pH and analyzed for dimethyl sulfoxide (hereinafter referred to otherwise as "DMSO") by gas chromatography. The waste water subjected to the treatment had a COD (Cr) concentration of 54 g/liter, a pH value of 13.5, and a DMSO content of 6.9 g/liter. The conditions of the treatment of the waste water which was carried out by following the procedure of Example 18 were 200° C. of treating temperature, 40 kg/cm$^2$ G of treating pressure, 1.5 of O$_2$/COD (Cr) (amount of oxygen in air/amount of chemical oxygen demand) ratio, and 1 hr$^{-1}$ of space velocity. The treated liquid obtained at the end of 500 hours' treatment had a COD (Cr) concentration of 3.3 g/liter, an efficiency of COD (Cr) treatment of 94%, and a pH value of 8.6. It was found to contain no detectable DMSO. The treatment of the waste water was subsequently stopped and the catalyst was removed from the wet oxidation reaction column. The catalyst showed no sign of any noticeable change due to the treatment.

Control 30

The procedure of Example 59 was repeated, except that the molded product obtained in Control 18 was used in the place of the catalyst used in Example 59. The treated liquid obtained immediately after the start of the treatment had a COD (Cr) concentration of 28 g/liter, an efficiency of COD (Cr) treatment of 48%, and a pH value of 9.3. It was found to contain DMSO at a concentration of 2.1 g/liter.

Control 31

The procedure of Example 59 was repeated, except that the molded product obtained in Control 19 was used in the place of the catalyst used in Example 59. The treated liquid obtained immediately after the start of the treatment had a COD (Cr) concentration of 4.2 g/liter, an efficiency of COD (Cr) treatment of 92%, and a pH value of 8.6. It was found to contain no detectable DMSO.

The treated liquid obtained at the end of 500 hours' treatment had a COD (Cr) concentration of 16 g/liter, an efficiency of COD (Cr) treatment of 70%, and a pH of 9.0. It was found to contain DMSO at a concentration of 0.3 g/liter. The treatment of the waste water was subsequently stopped and the molded product was extracted from the wet oxidation reaction column. When the extracted molded product was analyzed by the fluorescent X-ray method for change of composition, it was found to have the palladium content thereof slightly decreased particularly in the portion thereof near the input part of the reaction column. The portion of the molded product near the input part was found to be composed of TiO$_2$ and Pd at a weight ratio of 100:0.14.

EXAMPLE 60

In an plant for wet oxidation treatment illustrated in FIG. 1, a wet oxidation reaction column was packed with 1 liter of the catalyst produced in Example 40 and a treatment under the conditions of wet oxidation treatment was continued for 500 hours. The treated liquid obtained at the end of the 500 hours' treatment was tested for COD (Cr) concentration and pH and analyzed for sulfide ion by use of a detecting tube and for thiosulfuric acid by anion chromatography. The waste water subjected to the treatment had a COD (Cr) concentration of 11 g/liter, a pH value of 13.4, a sulfide ion content of 4.0 g/liter, and a thiosulfuric acid ion content of 0.30 g/liter. The conditions of the treatment of the waste water which was carried out by following the procedure of Example 18 were 160° C. of treating temperature, 9 kg/cm$^2$ G of treating pressure, 3.0 of $O_2$/COD (Cr) (amount of oxygen in air/amount of chemical oxygen demand) ratio, and 1 hr$^{-1}$ of liquid hourly space velocity.

The treated liquid obtained at the end of 500 hours' treatment had a COD (Cr) concentration of 3.4 g/liter, an efficiency of COD (Cr) treatment of 69%, and a pH value of 8.5. It was found to contain neither sulfide ion nor thiosulfuric acid ion. The treatment of the waste water was subsequently stopped and the catalyst was removed from the wet oxidation reaction column. The catalyst showed no sign of any noticeable change due to the treatment.

Control 32

The procedure of Example 60 was repeated, except that the molded product obtained in Control 18 was used in the place of the catalyst used in Example 60. The treated liquid obtained immediately after the start of the treatment had a COD (Cr) concentration of 4.2 g/liter, an efficiency of COD (Cr) treatment of 62%, and a pH value of 8.7. It was found to contain thiosulfuric acid ion at a concentration of 0.60 g/liter but no detectable sulfide ion.

EXAMPLE 61

In an plant for wet oxidation treatment illustrated in FIG. 1, a wet oxidation reaction column was packed with 1 liter of the catalyst produced in Example 44 and a treatment under the conditions of wet oxidation treatment was continued for 500 hours. The treated liquid obtained at the end of the 500 hours' treatment was tested for COD (Cr) concentration and pH and analyzed for dimethyl formamide by gas chromatography. The waste water subjected to the treatment had a COD (Cr) concentration of 39 g/liter, a pH value of 13.3, and dimethyl formamide content of 8.5 g/liter. The conditions of the treatment of the waste water which was carried out by following the procedure of Example 18 were 235° C. of treating temperature, 60 kg/cm$^2$ G of treating pressure, 1.2 of $O_2$/COD (Cr) (amount of oxygen in air/amount of chemical oxygen demand) ratio, and 1 hr$^{-1}$ of liquid hourly space velocity.

The treated liquid obtained at the end of 500 hours' treatment had a COD (Cr) concentration of 1.7 g/liter, an efficiency of COD (Cr) treatment of 96%, and a pH value of 8.8. It was found to contain no detectable dimethyl formamide. The treatment of the waste water was subsequently stopped and the catalyst was removed from the wet oxidation reaction column. The catalyst showed no sign of any noticeable change due to the treatment.

Control 33

The procedure of Example 61 was repeated, excep that the molded product obtained in Control 21 was used in the place of the catalyst used in Example 61. The treated liquid obtained immediately after the start of the treatment had a COD (Cr) concentration of 2.4 g/liter, an efficiency of COD (Cr) treatment of 94%, and a pH value of 9.0. It was found to contain no detectable dimethyl formamide.

The treated liquid obtained at the end of 500 hours' treatment had a COD (Cr) concentration of 15.7 g/liter, an efficiency of COD (Cr) treatment of 60%, and a pH of 10.3. It was found to contain dimethyl formamide at a concentration of 2.1 g/liter. The treatment of the waste water was subsequently stopped and the molded product was extracted from the wet oxidation reaction column. When the extracted molded product was analyzed by the fluorescent X-ray method for change of composition, it was found to have the platinum content thereof decreased particularly in the portion thereof near the input part of the reaction column. The portion of the molded product near the input part was found to be composed of $ZrO_2$ and Pt at a weight ratio of 100:0.03.

EXAMPLE 62

The procedure of Example 61 was repeated, except that the catalyst obtained in Example 45 was used in the place of the catalyst used in Example 61. The treated liquid obtained at the end of 500 hours' treatment had a COD (Cr) concentration of 1.9 g/liter, an efficiency of COD (Cr) treatment of 5%, and a pH of 8.8. It was found to contain no detectable dimethyl formamide. Subsequently, the treatment of the waste water was stopped and the catalyst was removed from the wet oxidation reaction column. The catalyst showed no sign of any noticeable change due to the treatment.

Control 34

The procedure of Example 61 was repeated, except that the molded product obtained in Control 22 was used in the place of the catalyst used in Example 61. The treated liquid obtained immediately after the start of the treatment had a COD (Cr) concentration of 3.3 g/liter, an efficiency of COD (Cr) treatment of 92%, and a pH value of 9.0. It was found to contain no detectable dimethyl formamide.

The treated liquid obtained at the end of 500 hours' treatment had a COD (Cr) concentration of 15.9 g/liter, an efficiency of COD (Cr) treatment of 59%, and a pH of 10.6. It was found to contain dimethyl formamide at a concentration of 2.7 g/liter. The treatment of the waste water was subsequently stopped and the molded product was extracted from the wet oxidation reaction column. When the extracted molded product was analyzed by the fluorescent X-ray method for change of composition, it was found to have the rhodium content thereof decreased particularly in the portion thereof near the input part of the reaction column. The portion of the molded product near the input part was found to be composed of $TiO_2$ and Rh at a weight ratio of 100:0.08.

EXAMPLE 63

The procedure of Example 61 was repeated, except that the catalyst obtained in Example 46 was used in the place of the catalyst used in Example 61. The treated liquid obtained at the end of 500 hours' treatment had a COD (Cr) concentration of 2.4 g/liter, an efficiency of COD (Cr) treatment of 94%, and a pH of 8.8. It was found to contain no detectable dimethyl formamide. Subsequently, the treatment of the waste water was stopped and the catalyst was removed from the wet oxidation reaction column. The catalyst showed no sign of any noticeable change due to the treatment.

Control 35

The procedure of Example 61 was repeated, except that the molded product obtained in Control 23 was used in the place of the catalyst used in Example 61. The treated liquid obtained immediately after the start of the treatment had a COD (Cr) concentration of 3.5 g/liter, an efficiency of COD (Cr) treatment of 91%, and a pH value of 9.0. It was found to contain no detectable dimethyl formamide.

The treated liquid obtained at the end of 500 hours' treatment had a COD (Cr) concentration of 16.2 g/liter, an efficiency of COD (Cr) treatment of 58%, and a pH of 11.0. It was found to contain dimethyl formamide at a concentration of 3.6 g/liter. The treatment of the waste water was subsequently stopped and the molded product was extracted from the wet oxidation reaction column. When the extracted molded product was analyzed by the fluorescent X-ray method for change of composition, it was found to have the iridium content thereof decreased particularly in the portion thereof near the input part of the reaction column. The portion of the molded product near the input part was found to be composed of $TiO_2$ and Ir at a weight ratio of 100:0.04.

EXAMPLE 64

In a plant for wet oxidation treatment illustrated in FIG. 1, a wet oxidation reaction column was packed with 1 liter of the catalyst produced in Example 39 and a treatment under the conditions of wet oxidation treatment was continued for 500 hours. The treated liquid obtained at the end of the 500 hours' treatment was tested for ammonium ion concentration, nitric acid ion concentration, and nitrous acid ion concentration by ion chromatography, for total nitrogen concentration by the total nitrogen analyzer, and for pH as well. The waste water subjected to the treatment had a pH value of 10.2 and contained ammonium ion at a concentration of 3.5 g/liter, and contained neither nitrous acid ion nor nitric acid ion. The total nitrogen concentration was 2.7 g/liter. The conditions of the treatment of the waste water which was carried out by following the procedure of Example 18 were 250° C. of treating temperature, 75 kg/cm$^2$ G of treating pressure, and 1 hr$^{-1}$ of liquid hourly space velocity. The amount of air supplied to the reaction column was such that the amount of molecular oxygen supplied was three times that of ammonium supplied in molar ratio.

The treated liquid obtained at the end of 500 hours' treatment had a pH value of 7.4 and a nitric acid ion concentration of 0.44 g/liter but contained neither ammonium ion nor nitrous acid ion. The total nitrogen concentration was 0.10 g/liter and the efficiency of total nitrogen treatment was 96%. The treatment of the waste water was subsequently stopped and the catalyst was removed from the wet oxidation reaction column. The catalyst showed no sign of any noticeable change due to the treatment.

EXAMPLE 65

In a plant for wet oxidation treatment illustrated in FIG. 1, a wet oxidation reaction column was packed with 1 liter of the catalyst produced in Example 8 and a treatment under the conditions of wet oxidation treatment was continued for 500 hours. The treated liquid obtained at the end of the 500 hours' treatment was tested for ammonium ion concentration, nitric acid ion concentration, and nitrous acid ion concentration by ion chromatography, for total nitrogen concentration by the total nitrogen analyzer, and for pH as well. The waste water subjected to the treatment had a pH value of 10.2 and contained ammonium ion at a concentration of 3.5 g/liter, and contained neither nitrous acid ion nor nitric acid ion. The total nitrogen concentration was 2.7 g/liter. The conditions of the treatment of the waste water which was carried out by following the procedure of Example 18 were 250° C. of treating temperature, 75 kg/cm$^2$ G of treating pressure, and 1 hr$^{-1}$ of liquid hourly space velocity. The amount of air supplied to the reaction column was such that the amount of molecular oxygen supplied was three times that of ammonium supplied in molar ratio. The treated liquid obtained at the end of 500 hours' treatment had a pH value of 7.4 and a nitric acid ion concentration of 0.31 g/liter but contained neither ammonium ion nor nitrous acid ion. The total nitrogen concentration was 0.09 g/liter and the efficiency of total nitrogen treatment was 97%. The treatment of the waste water was subsequently stopped and the catalyst was removed from the wet oxidation reaction column. The catalyst showed no sign of any noticeable change due to the treatment.

Control 36

The procedure of Example 64 was repeated, except that the molded product obtained in Control 18 was used in the place of the catalyst used in Example 64. The treated liquid obtained immediately after the start of the treatment had a pH value of 10.0, an ammonium ion concentration of 3.2 g/liter, and a nitrous ion concentration of 0.40 g/liter. The total nitrogen concentration was 2.6 g/liter and the efficiency of total nitrogen treatment was 4%. No nitric acid ion was detected.

EXAMPLE 66

With a mixed solution consisting of 0.40 liter of an aqueous manganese nitrate $[Mn(NO_3)_2]$ solution (equivalent to 50 g of $MnO_2$ per liter) and 0.45 liter of an aqueous potassium nitrate $[KNO_3]$ solution (equivalent to 2.5 g of K per liter), 1.98 kg of pellets composed of $Fe_2O_3$ and $TiO_2$ at a weight ratio of 90:10 obtained in Example 9 was impregnated. The impregnated pellets were dried at 120° C. for 10 hours and then calcined under an atmosphere of air at 300° C. for three hours.

The catalyst consequently obtained was found by the fluorescent X-ray method to be composed of $MnO_2$, $Fe_2O_3$, $TiO_2$, and K at a weight ratio of 1:89:10:0.06. By the BET method, it was found to have a specific surface area of 34 m2/g. When it was analyzed by the X-ray diffraction for crystal structure of oxide of manganese, the diffraction pattern showed no grating of the oxide of manganese.

EXAMPLE 67

The procedure of Example 24 was repeated, except that the catalyst obtained in Example 66 was used in the place of the catalyst used in Example 24.

The treated liquid obtained at the end of 500 hours' treatment had a COD (Cr) concentration of 4.0 g/liter, an efficiency of COD (Cr) treatment of 91%, and a pH of 8.7. It was found to contain no detectable dimethyl formamide.

Subsequently, the treatment of the waste water was stopped and the catalyst was removed from the wet oxidation reaction column. The catalyst showed no sign of any noticeable change due to the treatment.

EXAMPLE 68

The procedure of Example 29 was repeated, except that the catalyst obtained in Example 12 was used in the place of the catalyst used in Example 29.

The treated liquid obtained at the end of 100 hours' treatment had a COD (Cr) concentration of 0.62 g/liter, an efficiency of COD (Cr) treatment of 98%, and a pH of 8.6. It was found to contain no detectable aniline.

Subsequently, the treatment of the waste water was stopped and the catalyst was removed from the wet oxidation reaction column. The catalyst showed no sign of any noticeable change due to the treatment.

INDUSTRIAL APPLICABILITY

This invention aims generally to treat the waste water from chemical plant facilities, plating industry facilities, leather production facilities, metal industry facilities, metal mining facilities, food production facilities, pharmaceutical industry facilities, textile industry facilities, paper pulp industry facilities, dye industry facilities, glass production facilities, photographic processing facilities, etc. Preferably, these waste water contain at least one compound selected from the group consisting of nitrogen-containing compounds, sulfur-containing compounds, and halogen-containing compounds. The treatment of waste water according to this invention is particularly effective as compared with that by the conventional method when the nitrogen-containing compound is an organic nitrogen compound or the halogen-containing compound is an organic halogen compound.

The term "nitrogen-containing compound" as used in this invention refers to such inorganic nitrogen compound as ammonia and hydrazine and organic nitrogen compound. The term "organic nitrogen compound" refers to an organic compound which contains at least one nitrogen atom. As typical examples of the organic nitrogen compound, nitrogen atom-containing low molecular organic substances such as dimethyl formamide, pyridine, picoline, acetamide, aniline, glycine, alanine, phenyl alanine, glutamic acid, lysine, aspartic acid, serine, methionine, histidine, ethylene diamine, ethanol amine, and triethanolamine, cationic or amphoteric surfactants such as dodecyl amine, and nitrogen atom-containing polymers such as polyacrylamide may be cited.

Then, the term "sulfur-containing compound" as used in this invention refers to an inorganic or an organic compound containing at least one sulfur atom other than sulfuric acid radical. As typical examples of the compound, sulfur atom-containing low molecular organic substances such as dimethyl sulfoxide, dimethyl sulfone, methane sulfonic acid, thiophene, thiophthene, p-toluene sulfonic acid, sulfobenzoic acid, thioacetic acid, and naphthalene sulfonic acid, anionic or amphoteric surfactants such as dodecylbenzene sulfonic acid, polysulfonic acid type sulfur atom-containing polymers, and sulfur atom-containing inorganic substances such as thiosulfuric acid, sulfurous acid and sodium sulfide may be cited.

The term "halogen-containing compound" as used in this invention refers to inorganic halogen compounds and organic halogen compounds such as sodium chloride and sodium bromate. The term "organic halogen compound" refers to an organic compound containing at least one halogen atom. The organic halogen compounds include such halogen atom-containing organic substances as methyl chloride, methyl bromide, ethyl chloride, ethyl bromide, dichloroethylene, tetrachloroethylene, 1,1,1-trichloroethane, vinyl chloride, benzyl bromide, p-chlorophenol, trichlorofluoromethane, and dichlorofluoromethane, for example.

The concentration at which these compounds are to be used is not particularly limited. The inorganic COD component and the organic substance are desired to be contained in the relevant waste water at concentrations in the range of from 10 mg/liter to 100 g/liter, preferably from 100 mg/liter to 50 mg/liter. If the concentration is less than 10 mg/liter, the waste water will be treated fully satisfactorily without particularly requiring the use of the catalyst according to this invention. Conversely, if the concentration exceeds 100 g/liter, various control such as the temperature of the wet oxidation treatment and the feed volume of the oxygen-containing gas will become difficulty. If the waste water is an inorganic salt and has an unduly high concentration, the line for conveyance thereof will be clogged by the precipitate from the waste water. Thus, the concentration of an inorganic salt is desired to be less than 200 g/liter.

We claim:

1. A method for the treatment of waste water, which comprises subjecting said waste water to wet oxidation treatment with an oxygencontaining gas in the presence of a catalyst under pressure such that said waste water retains the liquid phase thereof at temperatures of not less that 140° C. and less than 370° C., said catalyst consisting essentially of an oxide of manganese obtained by heat-treating a precursor of anoxide of manganese in an oxidizing atmosphere at a temperature of 300° to 550° , and the oxide of at least one metal selected from the group consisting of iron, titanium, and zirconium, the oxidation level of said oxide of manganese being in the range of x=1.7 to 2.0 as $MnO_x$, the BET surface area being in the range of from 5 to 200 $m^2/g$.

2. A method according to claim 1, wherein said waste water contains at least one compound selected from amount nitrogen-containing compounds, sulfur-containing compounds, and halogen-containing compounds.

3. A method according to claim 1, wherein said oxide of manganese accounts for a proportion in the range of from 0.05 to 50% by weight as $MnO_2$ and said oxide of at least one metal selected from the group consisting of iron, titanium, and zirconium for a total proportion in the range of from 99.85 to 50% by weight as $Fe_2O_3$, $TiO_2$, or $ZrO_2$.

4. The method according to claim 3 wherein said oxides as catalyst components are mixed with an other inorganic oxide selected from the group consisting of cobalt, nickel, chromium tin, niobium barium, aluminum, silicon, sodium and potassium and molded, the amount of said other inorganic oxide being in the range of from 70 to 0.01% by weight based on the total amount of the catalyst.

5. The method according to claim 3, wherein said oxides as catalyst components are deposited on an inorganic oxide carrier selected from the group consisting of cobalt, nickel, chromium, tin, niobium, barium, aluminum. silicon, sodium and potassium or a metallic carrier, the amount of said carrier being in the range of from 99.5 top 20% by weight, based on the total amount of the catalyst.

6. A method for the treatment of waste water, which comprises subjecting said waste water to wet oxidation treatment with an oxygen-containing gas in the presence of a catalyst under pressure such that said waste water retains the liquid phase thereof at temperatures of not less that 140° C. and less than 370° C. said catalyst consisting essentially of an oxide of manganese obtained by heat-treating a precursor of an oxide of manganese in an oxidizing atmosphere at a temperature of 300° to 559° C., the oxide of of least one metal selected from the group consisting of iron, titanium, and zirconium, the oxidation level of said oxide of manganese being in the range of x=1.7 to 2.0 as $MnO_x$, the BET surface area being in the range of from 5 to 200 $m^2/g$ and at least on precious metal selected from the group consisting of ruthenium, rhodium, palladium, iridium, and platinum, the amount of said precious metal being in the range of from 0.05 to 10% by weight, based on 100 parts by weight of the oxides as catalyst components.

7. A method for the treatment of a waste water, which comprises subjecting said waste water to wet oxidation treatment with an oxygen-containing gas in the presence of a catalyst under pressure such that said waste water retains the liquid phase thereof at temperatures of not less than 140° C. and less than 370° C., said catalyst consisting essentially of an oxide of manganese, obtained by heat-treating a precursor of oxide of manganese in an oxidizing atmosphere at a temperature of 300° to 550° C. a composite oxide of iron and titanium, and/or a composite oxide of iron and zirconium, the oxidation level of said oxide of manganese being in the range of x=1.7 to 2.0 as $MnO_x$, the BET surface areas being in the range from 5 to 200 $m^2/g$.

8. A method according to claim 7, wherein said waste water contains at least one compound selected from the group consisting of nitrogen-containing compounds, sulfur-containing compounds, and halogen-containing compounds.

9. A method according to claim 7, wherein said oxide of manganese accounts for a proportion in the range of from 0.05 to 50% by weight as $MnO_2$ and said composite oxide iron of and titanium and/or said composite oxide of iron and zirconium account for a total proportion in the range of from 99.85 to 50% by weight as $Fe_2O_3$, $TiO_2$, or $ZrO_2$.

10. The method according to claim 9, wherein said oxides as catalyst components are mixed with an other inorganic oxide selected from the group consisting of cobalt, nickel, chromium, tin, niobium, barium, aluminum, silicon, sodium and potassium and molded, the amount of said other inorganic oxide being in the range of from 70 to 0.01% by weight, based on the total amount of The catalyst.

11. The method according to claim 9, wherein said oxides as catalyst components are deposited on an inorganic oxide carrier selected from the group consisting of cobalt, nickel, chromium, tin, niobium, barium, aluminum, silicon, sodium and potassium or a metallic carrier, the amount of said carrier being in the range of from 99.5 to 20% by weight, based on the total amount of the catalyst.

12. A method for the treatment of a waste water, which comprises subjecting said waste water to wet oxidation treatment with an oxygen-containing gas in the presence of a catalyst under pressure such that said waste water retains the liquid phase thereof at temperature of not less than 140° C. and less than 370° C., said catalyst consisting essentially of an oxide of mangaanose, obtained by heat-treating a precursor of an oxide of manganese in an oxidizing atmosphere at a temperature of 390° to 550° C., a composite oxide of iron and titanium, and/or a composite oxide of iron and zirconium, the oxidation level of said oxide of manganese being in the range of x=1.7 to 2.0 as-$MnO_x$,x the BET surface areas being in the range from 5 to 200 $m^2$ and at least one precious metal selected from the group consisting of ruthenium, rhodium, palladium, iridium, and platinum, the amount of said precious metal being in the range of from 0.05 to 10% by weight, based on 100 parts by weight of the oxides as catalyst components.

13. A method for the treatment of a waste water, which comprises subjecting said waste water to wet oxidation treatment with an oxygen-containing gas in the presence of a catalyst under pressure such that said waste water retains the liquid phase thereof at a temperatures of not less than 140° C. and less than 370° C., said catalyst consisting essentially of an composite oxide of manganese and at least one metal selected from the group consisting of iron, titanium, and zirconium, the amount of said oxide of manganese being in the range of x=1.7 to 2.0 as $MnO_x$, the BET surface area being in the range of from 50 to 200 $m_2/g$ obtained by heat-treating precursor of a composite oxide of manganese and at least one metal selected from the group consisting of iron, titanium, and zirconium in an oxidizing atmosphere at a temperature of 300° to 550° C.

14. A method according to claim 13, wherein said waste water contains at least one compound selected from the group consisting of nitrogen-containing compounds, sulfur-containing compounds, and halogen-containing compounds.

15. A method according to claim 13, wherein said composite oxide of manganese accounts for a proportion in the range of from 0.05 to 50% by weight as $MnO_2$ and said composite oxide of at least one metal selected from the group consisting of iron, titanium, and zirconium accounts for a total proportion in the range of from 99.85 to 50% by weight as $Fe_2O_3$, $TiO_2$, or $ZrO_2$.

16. The method according to claim 15, wherein said oxides as catalyst components are mixed with an other inorganic oxide selected from the group consisting of cobalt, nickel, chromium, tin, niobium, barium, aluminum, silicon, sodium and potassium and molded, the amount of said other inorganic oxide being in the range of from 70 to 0,01% by weight, based on the total amount of the catalyst.

17. The method according to claim 15, wherein said oxides as catalyst components are deposited on an inorganic oxide carrier selected from the group consisting of cobalt, nickel, chromium, tin, niobium, barium, aluminum, silicon, sodium and potassium or a metallic carrier, the amount of said carrier being in the range of from 99.5 to 20% by weight, based on the total amount of the catalyst.

18. A method for the treatment of waste water, which comprises subjecting said waste water to wet oxidation treatment with an oxygen containing gas in the presence of a catalyst under pressure such that-said -wastewater retains the liquid phase thereof at a temperatures of not less than 140° C. and less than 370° C. said catalyst consisting essentially of an composite oxide of manganese and at least one metal selected from the group consisting of iron, titanium, and zirconium, the, oxidation level of said oxide of manganese being in the range of x=1.7 to 2.0 as $MnO_x$, the BET surface area being in the range of from 50 to $200 m^2/g$ obtained by heat-treating a precursor of a composite oxide of manganese and at least one metal selected from the group consisting of iron, titanium, and zirconium an oxidizing atmosphere at a temperature of 300° to 550° C. and at least one precious metal selected from the group consisting of ruthenium, rhodium, palladium, iridium, and platinum, the amount of said precious metal being in the range of from 0.05 to 10% by weight, based on 100 parts by weight of the oxides as catalyst components.

19. A method according to claim 13, which further comprises an oxide and/or the composite of at least one metal selected from the group consisting of iron, titanium, and zirconium, said composite oxide of manganese accounting for a proportion in the range of from 0.05 to 50% by weight as $MnO_2$ and said oxide and/or said composite oxide of at least one metal selected from the group consisting of iron, titanium, and zirconium for a total proportion being in the range of from 99.85 to 50% by weight as $Fe_2O_3$, $TiO_2$, or $ZrO_2$.

20. A method according to claim 19, which further comprises an oxide of manganese, said oxide and/or said composite oxide of manganese accounting for a proportion in the range of from 0.05 to 50% by weight as $MnO_2$ and said oxide and/or said composite oxide of at least one metal selected from the group consisting of iron, titanium, and zirconium for a total proportion being in the range of from 99.95 to 50% by weight as $Fe_2O_3$, $TiO_2$, or $ZrO_2$.

* * * * *